United States Patent [19]

Yajima et al.

[11] Patent Number: 4,947,262

[45] Date of Patent: Aug. 7, 1990

[54] HAND-HELD MANUALLY SWEEPING PRINTING APPARATUS

[75] Inventors: Hiroshi Yajima, Hamura; Masaki Hayashi, Tokyo; Takashi Satoh, Higashiyamato; Masaharu Shioya, Hamura, all of Japan

[73] Assignee: Casio Computer Co., Ltd., Tokyo, Japan

[21] Appl. No.: 339,871

[22] Filed: Apr. 14, 1989

Related U.S. Application Data

[63] Continuation of Ser. No. 298,832, Jan. 18, 1989, abandoned, which is a continuation of Ser. No. 59,610, Jun. 8, 1987, abandoned.

[30] Foreign Application Priority Data

Jun. 11, 1986 [JP] Japan .................................. 61-135181
Dec. 11, 1986 [JP] Japan ............................. 61-189811[U]

[51] Int. Cl.⁵ .................................................. H04N 1/21
[52] U.S. Cl. .................................. 358/296; 346/76 PH
[58] Field of Search ..................... 346/76 PH, 143; 358/256, 285, 288, 293, 294, 296, 286; 382/59

[56] References Cited

U.S. PATENT DOCUMENTS 3,541,248 11/1970 Young .
3,767,020 10/1973 Rowe .
3,973,111 8/1976 Washizuka .......................... 346/143
4,523,235 6/1985 Rajchman .
4,611,246 9/1986 Nihei .
4,626,925 12/1986 Toyoda .
4,750,049 6/1988 Murakami et al. .

FOREIGN PATENT DOCUMENTS 0183980 6/1986 European Pat. Off. .

*Primary Examiner*—Leo P. Picard
*Assistant Examiner*—L. Donovan
*Attorney, Agent, or Firm*—Frishauf, Holtz, Goodman & Woodward

[57] ABSTRACT

A hand-held manually sweeping printing apparatus includes a manually manipulatable housing. A data input section, a memory, a printer head, a roll of ink ribbon, and an encoder are mounted within the housing. When a user holds the microcopier and sweeps it across a piece of paper, the printer head can print image data on the paper. Since the printer head is movable in response to various conditions caused by the pressure applied to the piece of paper, or surface conditions of the paper, a high-quality printing is realized. The data input section may be replaced by an image sensor, in which case the information on an original can be read and reproduced on the piece of paper.

29 Claims, 16 Drawing Sheets

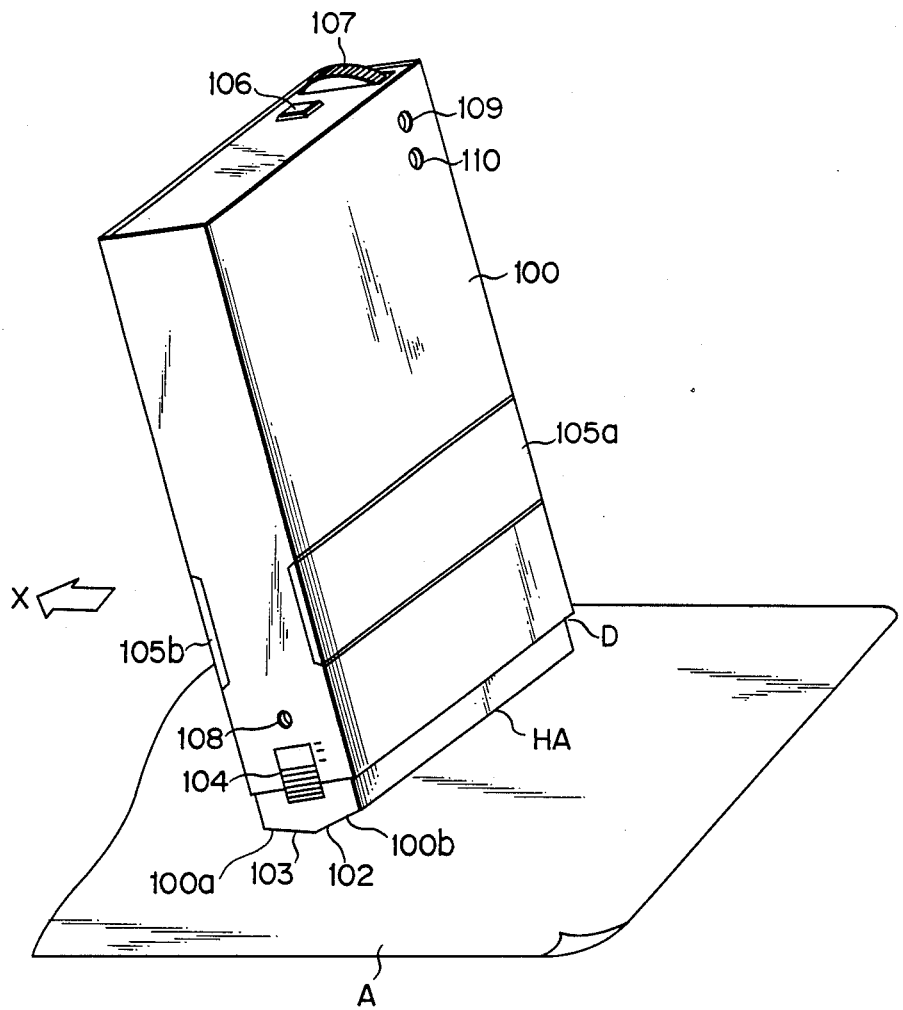
F I G. 1

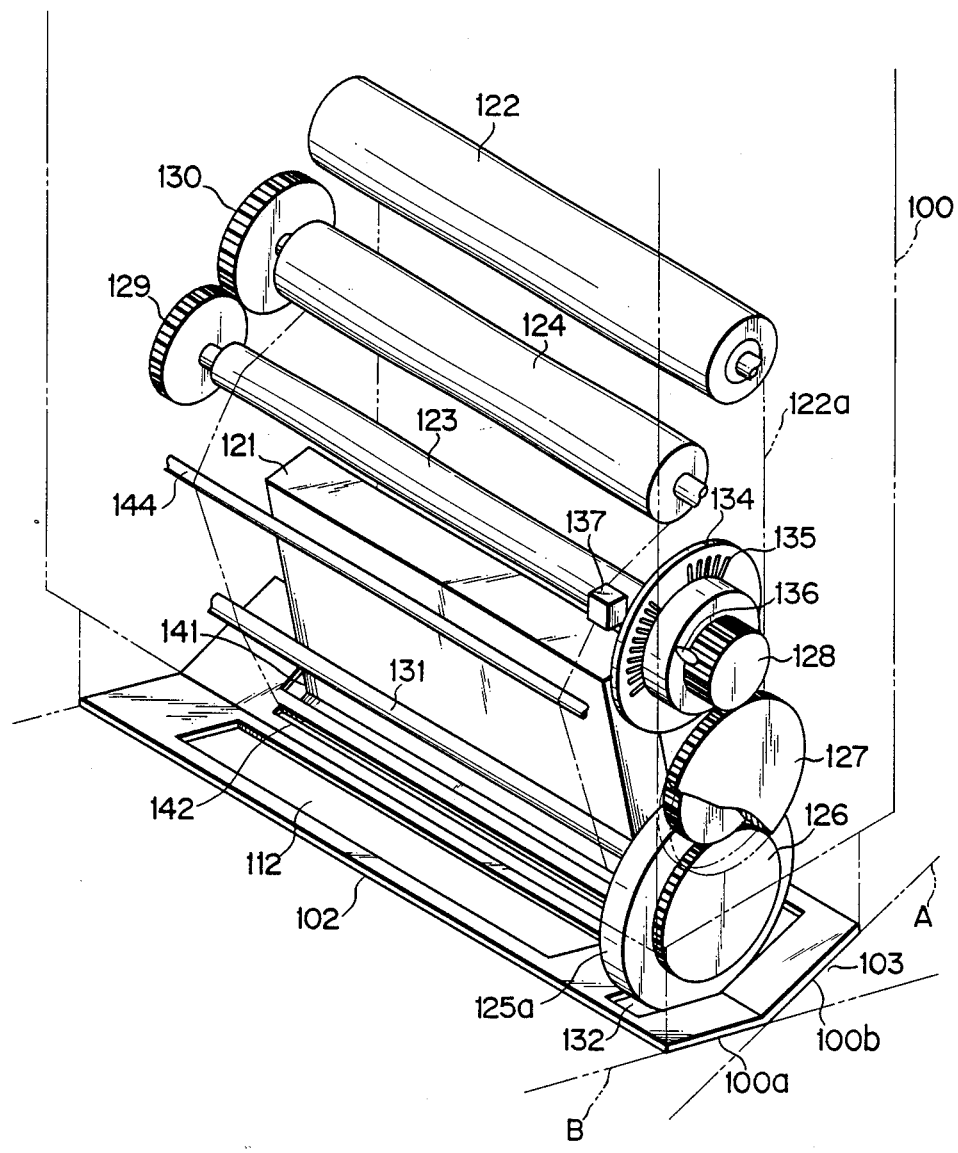
F I G. 3

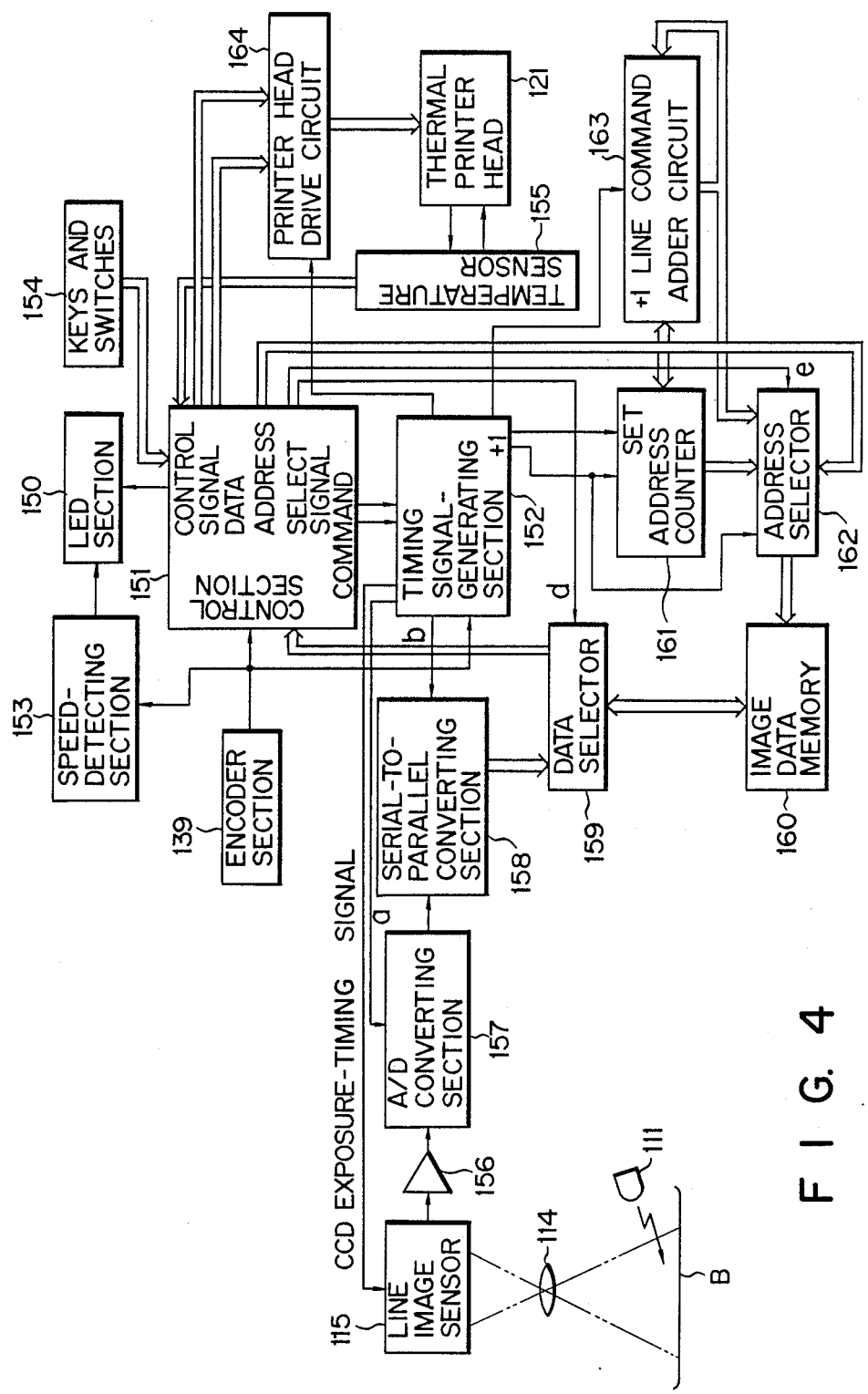
F I G. 4

FIG. 6A CCD EXPOSURE-TIMING SIGNAL
FIG. 6B OUTPUT SIGNAL OF ENCODER SECTION 139
FIG. 6C ENABLE SIGNAL "ES" FROM READ-TIMING SIGNAL GENERATOR 181
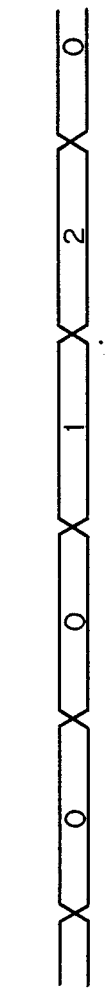
FIG. 6D "+1 LINE" COMMAND SIGNAL (OUTPUT DATA OF COUNTER)
FIG. 6E READ-TIMING SIGNAL a

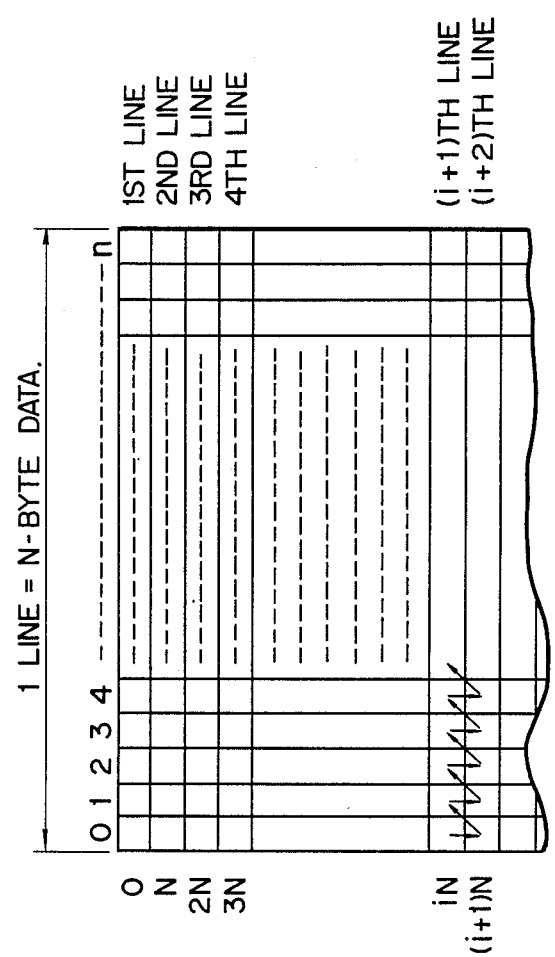
F I G. 7

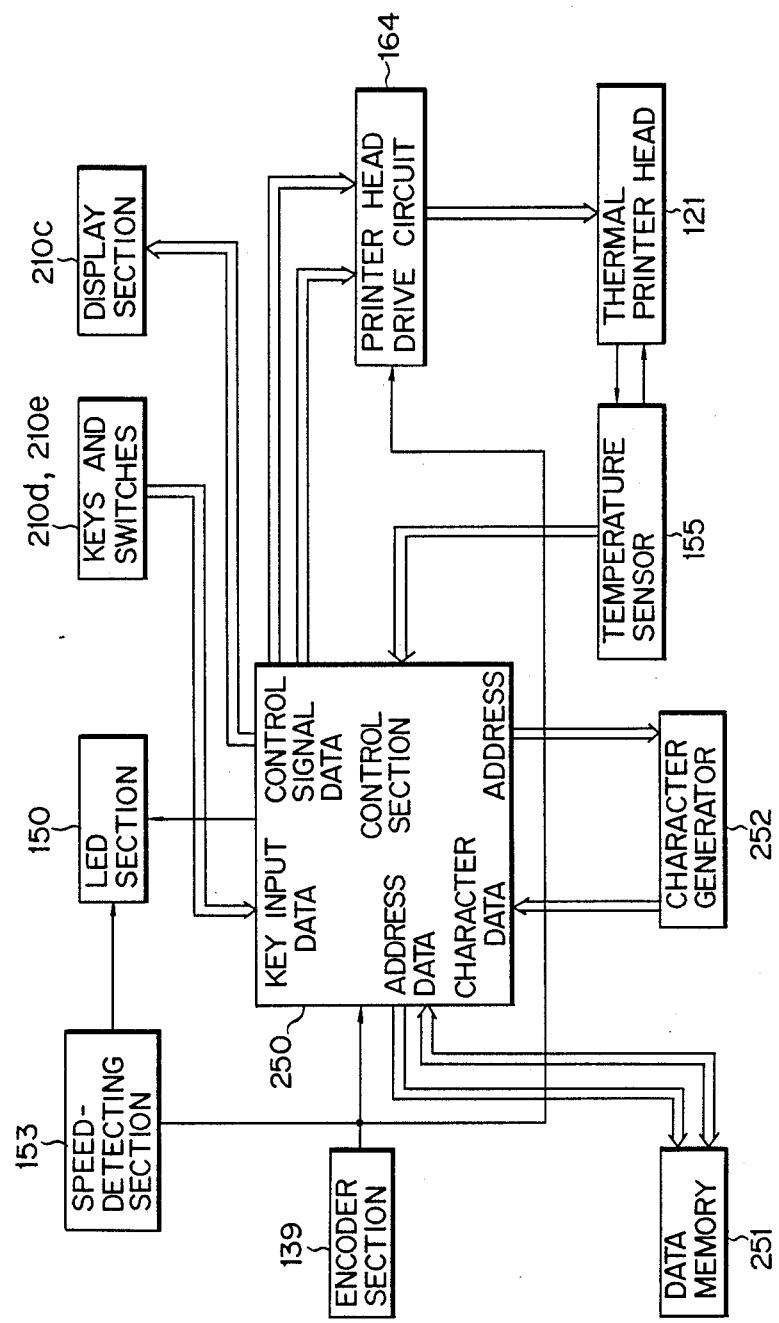
F I G. 11

HAND-HELD MANUALLY SWEEPING PRINTING APPARATUS

This application is a continuation of application Ser. No. 07/298,832, filed Jan. 18, 1989, which in turn is a continuation of Ser. No. 059,610 filed June 8, 1987 both abandoned.

BACKGROUND OF THE INVENTION

1. Field of the Invention

The present invention relates to a hand-held, electronic apparatus which can be manually passed over a material to be copied, thereby to optically read image information printed on the material, and can be manually moved across a piece of paper, thereby to faithfully reproduce or copy the image information on the paper.

2. Description of the Prior Art

Hand-held electronic apparatuses of this type are known. For instance, U.S. Pat. No. 3,767,020 to Rowe, Oct. 23, 1973 discloses a manually positionable automatic printer, which can be manually moved across a printing medium, thereby printing information on this printing medium. This automatic printer comprises a manually manipulatable housing, a wire matrix printer head, an inking ribbon, a timing signal generating means for generating timing signals as the printer is moved across the printing medium, and a control means for driving the printer head in accordance with the timing signals output from the timing signal generating means. The printer head, the ribbon, the signal generating means, and the control means are provided within the manually manipulatable housing. The housing is placed on the recording medium, with the head contacting the ribbon, which in turn contacts the recording medium. In this condition, the housing is held in a hand, and is moved across the medium. As the housing is thus moved, the signal generating means produces and supplies timing signals to the control means. In response to these signals, the printer head prints characters on the recording medium.

The manually positionable automatic printer has a drawback. Since it has a wire matrix printer head, it can hardly be made smaller and lighter, particularly when it is designed to perform a high-resolution printing.

Further, the conventional manually positionable printer is likely to print information in an uneven density or fail to print part of the information. This is because the printer head is fixed to the housing, and the contact between the head and the recording medium cannot remain in the same condition, or the pressure applied on the medium by the printer head cannot be kept constant during the image reproduction.

SUMMARY OF THE INVENTION

It is therefore an object of the present invention to provide a hand-held microcopier apparatus which is small and light, can be manufactured at low cost, and can freely print data in a high resolution on any recording medium such as leaves of a notebook.

It is another object of the invention to provide a hand-held microcopier apparatus capable of reading image information from a material to be copied, and of printing the image information on a piece of paper in a high resolution.

In order to accomplish the above objects, a hand-held microcopier apparatus according to the invention comprises:

a manually manipulatable housing;

an input device provided within the housing for generating image information signals as the housing is manually moved across the material to be copied;

a memory device provided within the housing for storing the image information signals supplied from the input device;

a printing device carried by the housing for printing image information on a printing medium as the housing is manually moved across the printing medium;

a printer-driving device provided within the housing for driving the printing device in response to the image information signals read from the memory device;

a position-detecting device carried by the housing to detect a position of the printing device being moved across the printing medium, thereby to produce a signal every time the printing device moved for a predetermined distance, the signal representing the position of the printing device; and a control device provided within the housing for controlling the printer-driving device in synchronism with the signal produced by the position-detecting device, so as to cause the printing device to print the image information on the printing medium in the same manner as the information is formed on the material to be copied.

BRIEF DESCRIPTION OF THE DRAWINGS

These and other objects and features of the invention will become apparent with reference to the following specification and to the drawings, in which:

FIG. 1 is a perspective view of a hand-held copier according to a first embodiment of the present invention;

FIG. 3 is a perspective view showing the major components of the hand-held copier;

FIG. 4 is a block diagram showing the electronic circuit provided within the hand-held copier;

FIGS. 6A to 6E illustrate a timing chart explaining how the copier reads information from an original;

FIG. 7 is a diagram explaining how image data is written into the image data memory used in the hand-held copier;

FIG. 11 is a block diagram showing the electronic circuitry commonly used in the second, third and fourth embodiments of the invention;

DETAILED DESCRIPTION OF THE PREFERRED EMBODIMENTS

Outline of Hand-Held Copier

Figure 2A:
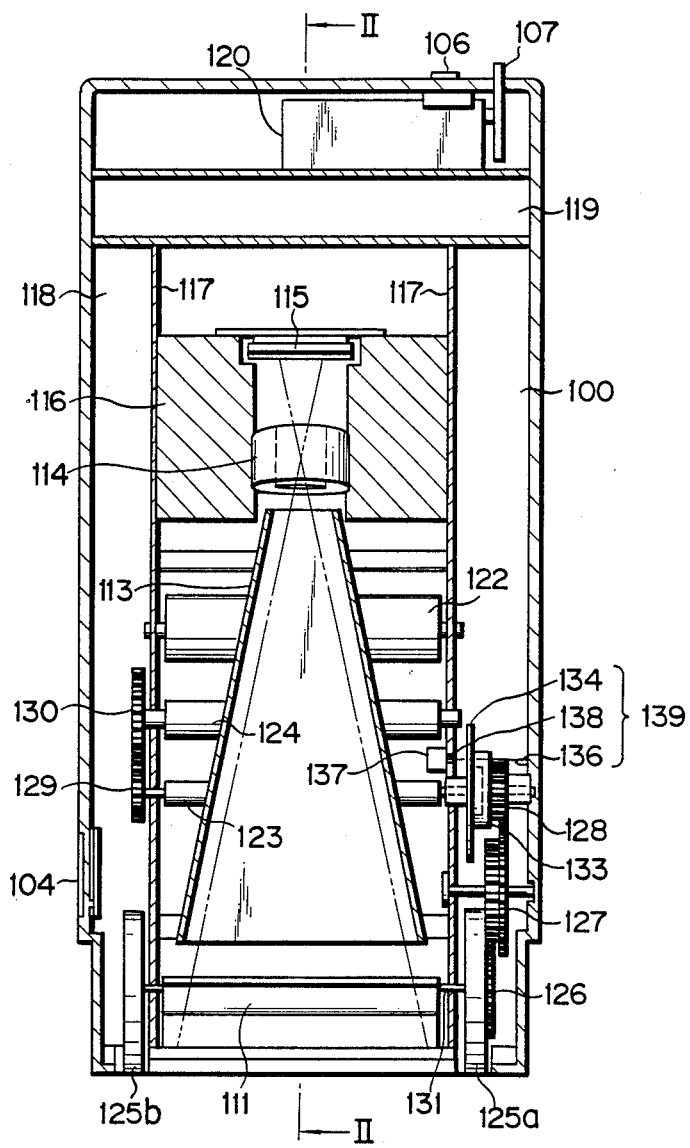
FIG. 2A is a sectional view showing the internal structure of the hand-held copier shown in FIG. 1.

A hand-held copier according to the first embodiment of the present invention, will now be described with reference to FIGS. 1 to 7. FIG. 1 is a perspective view showing the outer appearance of the hand-held, or handy copier. As is illustrated in this figure, the hand-held copier comprises a housing 70 mm wide, 30 mm thick, and 160 mm long and generally designated by 100. The copier can read and print an image having a width of 40 mm at most, and can store data representing an image having a width of 40 mm at most and a length of 200 mm at most. It can read dots printed in a resolution of 8 dots/mm at most, and can print ink dots in a resolution of 8 dots/mm at most.

Head section HA is attached to the distal end (or the lower end) of housing 100. Head section HA, which is designed to read an image from an original or a material to be copied and also to print the image on a piece of paper, is less wide and less thick than housing 100. Therefor, stepped portion D is formed between section HA and housing 100. The distal end of head section HA consists of two long, narrow inclined surfaces 100a and 100b. These inclined surfaces 100a and 100b are jointed at their loner sides, thus forming a ridge roof. Reading section 102 is mounted on inclined surface 100b, and printing section 103 is mounted on surface 100b. Power/read/print switch 104 is provided on one side of housing 100, and located at the lower end of this side. Operation switches 105a and 105b are provided on the opposing wider surface (referred to as "front surface" and "rear surface" not shown in FIG. 1) of housing 100, respectively. Both switches 105a and 105b are shaped like plates. Upper portions of the front and rear surfaces of housing 100 which are above operation switches 105a and 105b can be held between a user's thumb and fingers, so that the user may sweep the copier across an original to optically read image data or information from the original, or to print the image data on a piece of paper A. Power/read/print switch 104 is operated to turn the copier on or off, and to set the copier in a reading mode or a printing mode. More precisely, when switch 104 is operated to select either the reading mode or the printing mode, the apparatus is automatically turned on. Further, clear/reset key 106 and density control dial 107 are provided on the proximal end of housing 100. Clear key 106 is pushed to erase an image memory (later described in detail) when the hand-held copier is set in the reading mode, and to initialize the address of the image data memory when the copier is set in the printing mode. LED (light-emitting diode) 108 is provided near switch 104. Two other LEDs 109 and 110 are provided on the front side of housing 100, and located near the proximal end of housing 100. LED 108 is a power-supply pilot lamp, and LED 109 is a memory pilot lamp. LED 110 is an alarm lamp, and emits light when the hand-held copier is moved at a speed exceeding a predetermined value.

In order to read image data from an original by the hand-held copier, power/read/print switch 104 is moved to a "read" position, whereby the copier is turned on, and LED 108 emits light to inform the user that the copier is now ready to use. The user manually sweeps the copier across the original in a direction opposite to the X-direction as illustrated, while depressing both operation switches 105a and 105b and keeping reading section 102 in contact with the original B. Then the image data formed on the original is optically read by reading section 102 and is subsequently written into the image data memory.

To print out the image data thus read from the original, power/read/print switch 104 is moved to a "print" position. Then, the user again manually sweeps the copier across a piece of ordinary, or plain paper A, as a printing medium, in the direction of arrow X, while depressing both operation switches 105a and 105b and keeping printing section 103 in contact with paper A under a predetermined hand pressure. As a result, the image data is read out from the image data memory and is printed or reproduced on paper A by means of printer section 103.

Reading and Printing Operation

Reading section 102 and printing section 103, both provided within housing 100, will now be described in greater detail, with reference to FIGS. 2A and 2B and FIG. 3.

Figure 2B:
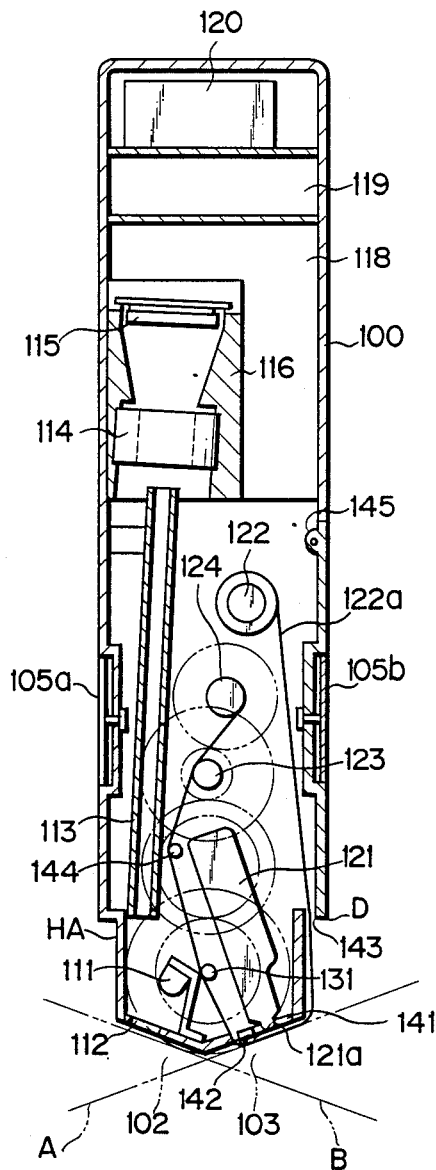
FIG. 2B is also a cross-sectional view of the hand-held copier, taken along line II—II in FIG. 2A and illustrating the major components of the copier.

As is shown in FIGS. 2A and 2B, reading section 102 includes light source 111 provided close to inclined surface 100a, window 112 provided in an opening cut in inclined surface 100a, and vertical light guide 113, lens 114 located at the top of guide 113, and line image sensor 115 provided above lens 114. Light source 111 includes an array of LEDs. The light emitted from light source 111 is applied to the original through window 112, and the light reflected from the original is guided by light guide 113 to lens 114 and then to image sensor 115. Image sensor 115 is, for instance, a 1024-bit CCD (charge-coupled device) line image sensor. Of 1024 bits, 320 bits are used to read an image having a width of 40 mm at most, in an image resolution of 8 dots/mm. Lens 114 and line image sensor 115 are held in specified positions by supporting member 116. This supporting member 116 is fastened to inner frame 117 provided within housing 100 and spaced apart by a predetermined distance from the inner surfaces of housing 100. Space 118 accommodating electronic parts (later described) is provided within housing 100, at one side of supporting member 116. Space 119 accommodating a battery is also provided within housing 100 and located above supporting member 116. Linear image sensor 115 is connected to a circuit board (not shown) provided within space 118. Clear key 106, density control dial 107, and the like, are connected to circuit board 120.

Within inner frame 117 there are provided thermal printer head 121, roll 122 of ink ribbon, roller 123 for feeding ribbon 122a at constant speed, and ribbon take-up roller 124. Rubber rollers 125a and 125b, and gears 126 to 130 are provided within the space between inner frame 117 and the inner surfaces of housing 100. Rubber rollers 125a and 125b are rotatably mounted on shaft 131 horizontally extending across inner frame 117 and protruding at both ends from inner frame 117. They are positioned such that parts of their peripheries protrude outside through slits 132 cut in the end portions of inclined surfaces 100a and 100b. Gear 126 is coaxially secured to rubber roller 125a. This gear 126, which has a smaller diameter than rubber roller 125a, is coupled by intermediate gear 127 to gear 128. Gear 128 is coupled by clutch 133 to the shaft of ribbon-feeding roller 123. Clutch 133, which is of one-way type, transmits the rotation of gear 128 to ribbon-feeding roller 123 when the user sweeps the hand-held copier across paper A to print an image on paper A.

Encoder disk 134 is fastened to the input-end of clutch 133. Encoder disk 134 can rotate, independently of the operation of one-way clutch 133, when gear 128 rotates. As is shown in FIG. 3, encoder disk 134 has a number of radial slits 135 located at regular intervals in the circumferential direction of disk 134. LED 136 is provided at one side of disk 134, and photosensor 137 is provided at the other side of disk 134. As is illustrated in FIG. 2A, LED 136 is secured to the inner surface of housing 100, and photosensor 137 is fastened to the inner surface of inner frame 117. Through hole 138 is cut in frame 117, positioned coaxially with photosensor 137. Hence, the light emitted from LED 136 can be applied to photosensor 137 first through slits 135 of encoder disk 134 and then via through hole 138. Encoder disk 134, LED 136 and photosensor 137 constitute encoder 139.

As is shown in FIG. 3, printing window 141 and ribbon-guiding window 142, both shaped like long slits, are cut in inclined surface 100b and extend parallel to each other. Ribbon-guiding window 142 is located closer to inclined surface 100b than printing window 141. Thermal printer head 121 has heating section 121a, which is inserted in printing window 141. Heating section 121a slightly protrudes from inclined surface 100a. Slit 143 is cut in stepped portion D close to that side of housing 100 on which operation key 105b is arranged, as is shown in FIG. 2B. Thermal-transfer ink ribbon 122a taken out of roll 122 is led outside housing 100 through slit 143, and then guided into housing 100 through ribbon-guiding window 142 after passing by heating section 121a of thermal printer head 121. Inside housing 100, ink ribbon 122a is guided by shaft 131, ink ribbon guide 144 and ribbon-feeding roller 123 and is finally taken up around ribbon take-up roller 124.

As is shown in FIG. 2B, the lower half of that side of housing 100 on which operation key 105b is provided can be opened when rotated around hinge 145. When the lower half of this side is open, used roll 122 of ribbon can be replaced with a new one, and the interior of housing 100 can be inspected for maintenance.

Electronic Circuit of Hand-Held Copier

The electric circuitry mounted on the circuit board provided within space 118 will now be explained with reference to FIG. 4.

As has been described, encoder section 139 includes encoder disk 134, LED 136 and photosensor 137. When the user manually sweeps the copier across the original B while keeping the copier in contact with the original B, rubber rollers 125a and 125b rotate, thus rotating encoder disk 134. As disk 134 rotates, the light emitted from LED 136 is intermittently applied to photosensor 137 through radial slits 135 of disk 134. Every time photosensor 137 receives the light, it produces a pulse. Hence, encoder section 139 generates a pulse signal consisting of such pulses and, thus, representing the distance over which the copier has been moved across the original. The pulse signal is supplied from encoder section 139 to control section 151, timing signal-generating section 152, and speed-detecting section 153. Speed-detecting section 153 detects the speed at which housing 100 is moved. It outputs an alarm signal when the speed of housing 100 exceeds a predetermined value. This alarm signal is supplied to LED section 150, thereby turning on LED 110 which functions as an alarm lamp.

The signals are supplied to control section 151, which are generated when keys and switches, 154, such as power/read/print switch 104, operations keys 105a and 105b, clear key 106 and density control dial 107, are operated. The signal generated by temperature sensor 155, which detects the temperature of thermal print head 121, is also supplied to control section 151. Control section 151 has a power-supply voltage detector (not shown). In accordance with the input signals, control section 151 controls LED 108 (i.e., the power-supply pilot lamp) and LED 109 (i.e., memory pilot lamp), both provided in LED section 150, and also controls other components of the copier. Further, control section 151 supplies an operation command to timing signal-generating section 152 when the hand-held copier is set either in the reading mode or in the printing mode.

Timing signal-generating section 152 generates a timing signal in response to the operation command given by control section 151. This signal represents the timing at which the line image sensor 115 are exposed to light one after another. Section 152 generates other timing signals in synchronism with the pulses of the signal supplied from encoder section 139, such as read-timing signals "a", serial-to-parallel conversion signals "b", "+1" signals, set signals and "+1 line" command signals.

Optically Reading by Image Sensor

The CCD exposure-timing signal output by timing signal-generating section 152 is supplied to line image sensor 115. Read-timing signals a are supplied to A/D converting section 157. Serial-to-parallel converting signals "b" are supplied to serial-to-parallel converting section 158. The "+1" signals are input to address counter 161 and also to address selector 162. The set signals are input to address counter 161. The "+1 line" command signals are supplied to adder circuit 163. Line image sensor 115 receives the light reflected from original B, in synchronism with the CCD exposure-timing signal, and produces output signals. The output signals of image sensor 115 are amplified by amplifier 156 and then input to A/D converting section 157. A/D converting section 157 converts these input signals into binary signals, or black signals and white signals, in synchronism with read-timing signals "a". The binary signals, thus obtained, are supplied to serial-to-parallel converting section 158. Section 158 converts the input signals into, for instance, 8-bit data signals in synchronism with serial-to-parallel conversion signals "b". These 8-bit data signals are input via data selector 159 to image data memory 160. Data selector 159 is connected to control section 151 by a data line. Selection signal "d" is supplied through this data line from section 151 to data selector 159. In accordance with selection signal "d", data selector 159 selects control section 151 or serial-to-parallel converting section 158.

Any desired write address of image data memory 160, which consists of a row address and a column address, is designated by the output of address counter 161 or by the output of adder circuit 163, and is selected by address selector 162. On the other hand, any read address of image data memory 160 is supplied from control section 151 to memory 160 via address selector 162. Address counter 161 counts the timing signals supplied from timing signal-generating section 152, thereby providing a row address and a column address. The address data thus provided is supplied to address selector 162 and also to adder circuit 163. Adder circuit 163 has a register (not shown). The address data input to address selector 162 is temporarily stored in this register, and is incremented by one every time a "+1 line" command signal is supplied to adder circuit 163 from timing signal-generating section 152. The row address and the column address output from adder circuit 163 are fed back to the input terminal of adder circuit 163, and are also supplied to address selector 162. In response to select signal "e" supplied from control section 151, address selector 162 selects address counter 161 and adder circuit 163, or control section 151. In response to a "+1" signal supplied from timing signal-generating section 152, address selector 162 selects either address counter 161 or adder circuit 163, and also designates one of the addresses of image data memory 160. Assume that address selector 162 has selected address counter 161 and adder circuit 163 in accordance with select signal "e". In this case, address selector 162 selects address counter 161 when the "+1" signal is at a high level, and selects adder circuit 163 when the "+1" signal is at a low level. When one line of image data is written into image data memory 160, timing signal-generating section 152 supplies a set signal to address counter 161. Then, the address data stored in the register provided within adder circuit 163 is input address counter 161, whereby the next line of image data can be written into image data memory 160.

After all image information on original B has been written into image data memory 160, the hand-held copier can be switched to the printing mode. When the copier is set in the printing mode, control section 151 causes data selector 159 to gradually read the image data from image data memory 160 as section 151 receives the output signals of encoder 139 which represent the distance the copier is moving across a piece of paper "A". Then, control section 151 determines an optimum time for supplying power to thermal printer head 121 from the data output by temperature sensor 155 and representing the temperature of printer head 121, the data output by the power-supply voltage detector and showing the power-supply voltage, and the data output by turning density control dial 107 and representing the selected print density. The data representative of this optimum time, or printing data, is output to printer head drive circuit 164. In accordance with the printing data, circuit 164 drives thermal printer head 121 in synchronism with the timing signals supplied from timing signal-generating section 152.

Timing Signal Generating

Figure 5:
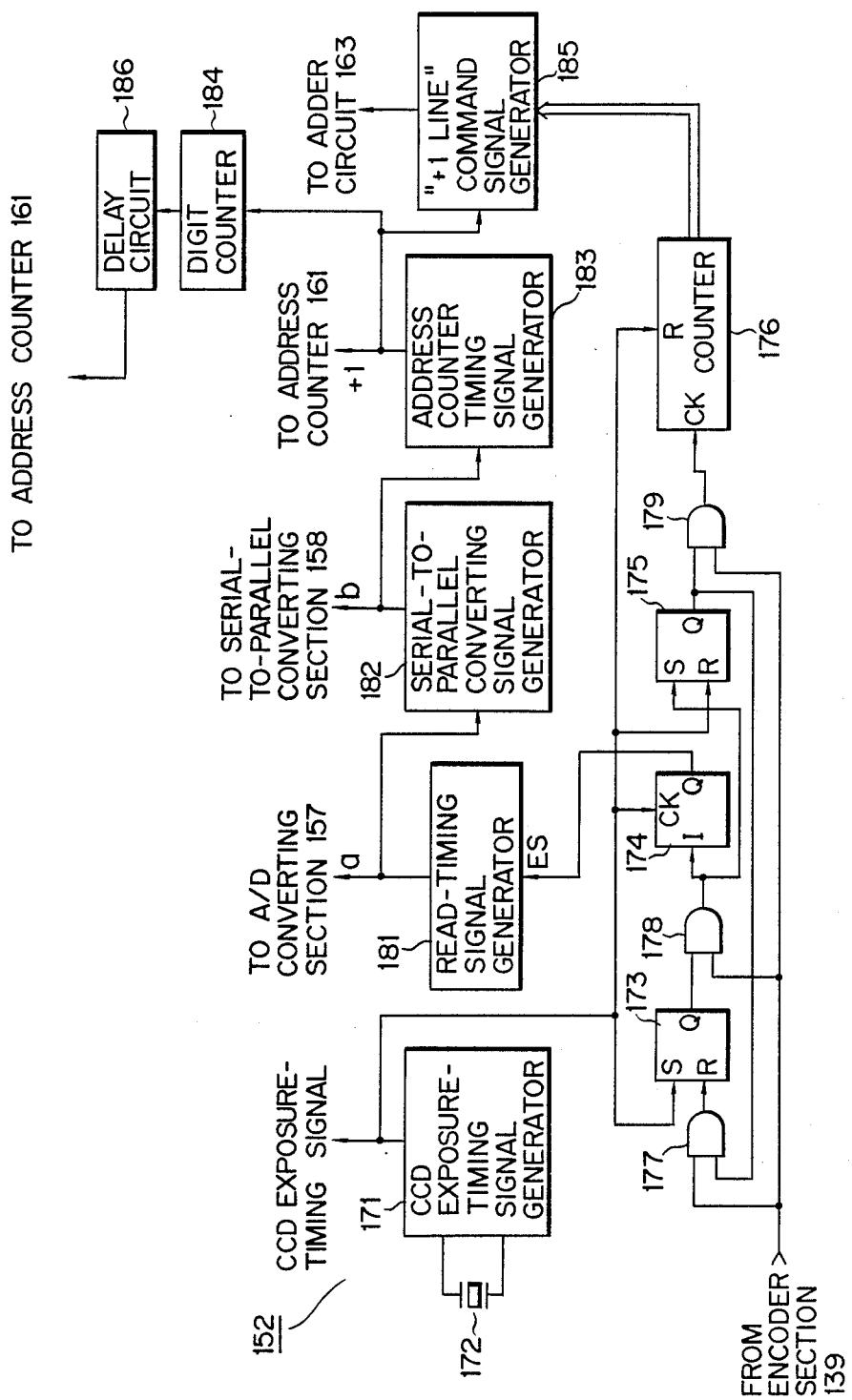
FIG. 5 is a block diagram of the timing signal generating section used in the hand-held copier.

Timing signal-generating section 152 will now be described in detail, with reference to FIG. 5. As is shown in FIG. 5, section 152 includes CCD exposure-timing signal generator 171. Quartz crystal oscillator 172 is connected to this signal generator 171. Generator 171 generates CCD (charge coupled device) exposure-timing signals as long as the hand-held copier is set in the reading mode. It generates these timing signals at the frequency determined based on the oscillation frequency of quartz crystal oscillator 172. The CCD exposure-timing signals are supplied to line image sensor 115 (FIG. 4). They are also supplied to the set terminal S of R-S flip-flop 173, to the clock terminal CK of D flip-flop 174, to the reset terminal R of R-S flip-flop 175, and to the reset terminal R of counter 176. Flip-flop 174 holds every input signal until a clock signal is supplied to its clock terminal CK. The pulse signal output from encoder section 139 and representing the distance the copier is being moved across original B is input to AND circuits 177, 178 and 179. The output of flip-flop 175 is input to AND circuit 177. The output of AND circuit 177 is supplied to the reset terminal R of flip-flop 173. The output signal of this flip-flop 173 is supplied via AND circuit 178 to the data input terminal I of flip-flop 174 and also to the set terminal S of flip-flop 175. The output signal of flip-flop 174 is supplied to read-timing signal generator 181 as enable signal "ES". The output signal of flip-flop 175 is supplied via AND circuit 179 to the clock terminal CK of counter 176. In response to enable signal "ES" supplied from flip-flop 174, read-timing signal generator 181 produces read-timing signal "a" which will be used to write one-line image data into image data memory 160. Signal "a" is input to A/D converting section 157 and serial-to-parallel converting signal generator 182. In response to read-timing signal "a", generator 182 generates serial-to-parallel converting signal "b" having a specified cycle. Signal "b" is input to serial-to-parallel converting section 158 and address counter timing signal generator 183. This signal generator 183 produces a "+1" signal upon receipt of serial-to-parallel converting signal "b". The "+1" signal is supplied to address counter 161 and also to address selector 162. The "+1" signal is also input to digit counter 184 and "+1 line" command signal generator 185. Signal generator 185 generates pulses in the same number as is represented by the count value of counter 176, when the "+1" signal output by address counter timing signal generator 183 falls from a high level to a low level. These pulses are supplied as a "+1 line" command signal to adder circuit 163. Digit counter 184 produces a carry signal every time its count value reaches the number of digits forming one line of the image data which image data memory 160 will store. This carry signal is delayed by delay circuit 186 for a predetermined period of time, and then supplied as a set signal to address counter 161.

Reading Operation

It will be explained how the hand-held copier is operated to read the information, such as characters and an image, from original B.

First, the user slides power/read/print switch 104 from a "power off" position to a "read" position. Then, power is supplied to the electronic circuit of the copier. Control section 151 causes LED 108 of LED section 15 thus informing the user that the electronic circuit has been turned on. The user manually sweeps the hand-held copier across original B in the direction opposite to arrow X (FIG. 1), while keeping reading section 102 in contact with original B and depressing both operation switches 105a and 105b. The light emitted from light source 111 is applied to original B through window 112 provided in inclined surface 100b. The light is reflected from original B. The light thus reflected is guided by light guide 113 (see FIG. 2B) and applied via lens 114 to linear image sensor 115.

As the hand-held copier is swept across original B, rubber rollers 125a and 125b, both contacting original B, rotate. Gears 126, 127 and 128 are, therefore, rotated. As a result, encoder disk 134 coupled to gear 128 rotates at the speed proportional to the speed at which the user manually sweeps the copier across original B. As encoder disk 134 rotates in this manner, the light emitted from LED 136 is intermittently applied to photosensor 137 through the radial slits 135 of encoder disk 134. Photosensor 137 produces a pulse every time it receives the light. Accordingly, it generates a pulse signal consisting of such pulses. The pulse signal, i.e., the output signal of encoder 134 (FIG. 4) which represents the distance the hand-held copier has been moved across original B, is supplied to control section 151, timing signal-generating section 152, and speed-detecting section 153.

CCD Exposure-Timing Signal Generating

In timing signal-generating section 152 shown in FIG. 5, CCD exposure-timing signal generator 171 generates a CCD exposure-timing signal consisting of pulses which are produced at regular time intervals as is illustrated in FIG. 6A. The CCD exposure-timing signal is supplied to line image sensor 115. This signal sets flip-flop 173 and resets flip-flop 175 and counter 176. When the first pulse of the output signal (FIG. 6B) of encoder section 139 is supplied to section 152 under this condition, this pulse is supplied via AND circuit 178 to the input terminal I of flip-flop 174 and the set terminal S of flip-flop 175. Flip-flop 174 does not immediately output this pulse, but will output the pulse as an enable signal "ES" to read-timing signal generator 181 when the CCD exposure-timing signal, shown in FIG. 6C, is supplied to flip-flop 174. Flip-flop 175 is reset by the output signal of AND circuit 178, and outputs a "1" level signal from its output terminal Q to AND circuits 177 and 176. When the second pulse of the output signal (FIG. 6B) of encoder section 139 is input to timing signal-generating section 152 under this condition, flip-flop 173 is set, and flip-flop 175 and counter 176 are reset. However, when the second pulse is input from encoder section 139 to section 152 before the CCD exposure-timing signal (FIG. 6A) is supplied to AND circuit 177, flip-flop 173 is reset, the gate of AND circuit 178 closes, and the output signal of AND circuit 179 rises to the "1" level. In this case, the count value of counter 176 is incremented by one. Accordingly, when the copier is moved across original B at a speed slightly lower than a predetermined value, and encoder section 139 outputs only one pulse between two consecutive pulses of the CCD exposure-timing signal, the count value of counter 176 remains "0". On the other hand, when the copier is swept across original B at a speed higher than the predetermined one, and encoder section 139 produces two or more pulses between two consecutive pulses of the CCD exposure-timing signal, the count value of counter 176 proportionally increases.

Meanwhile, when enable signal "ES" is input to read-timing signal generator 181, signal generator 181 generates a read-timing signal "a" which is shown in FIG. 6E. Signal a is input to A/D converting section 157 and also to serial-to-parallel converting signal generator 182. Signal generator 182 generates a serial-to-parallel converting signal "b". Signal "b" is supplied to serial-to-parallel converting section 158 and also to address counter timing signal generator 183. This signal generator 183 generates a "+1" signal upon receipt of serial-to-parallel converting signal "b", and outputs the "+1" signal to address counter 161, address selector 162, digit counter 184, and "+1 line" command signal generator 185. Signal generator 185 outputs pulses in the number proportionate to the count value of counter 176.

Image Signal from CCD

Line image sensor 115 produces image signals from the light reflected from original B, in synchronism with the pulses of the CCD exposure-timing signal output by timing signal-generating section 152. The image signals are amplified by amplifier 156 and then supplied to A/D converting section 157. A/D converting section 157 converts the image signals into serial digital signals in synchronism with the read-timing signal "a" output by timing signal-generating section 152. These serial digital signal are input to serial-to-parallel converting section 158. This section 158 converts the serial digital signals into parallel image data in synchronism with serial-to-parallel converting signal "b" supplied from timing signal-generating section 152. The image data, thus provided, is input to data selector 159. Data selector 159 has been connected to serial-to-parallel converting section 158 in accordance with select signal "d" supplied from control section 151. This is because the hand-held copier is set in the reading mode. Hence, the image data output from serial-to-parallel converting section 158 is supplied via data selector 159 to image data memory 160. Address selector 162, which is designed to designate the addresses of memory 160, has been coupled to address counter 161 and adder circuit 163 in accordance with select signal "e" supplied from control section 151. In this case, the image data is written into image data memory 160 in the following way.

First, timing signal-generating section 152 supplies a "+1" signal to address counter 161 and address selector 162. The count value of address counter 161 is incremented by one, and counter 161 outputs address data representing "ith line, 0th digit". At the same time, address selector 162 is connected from address counter 161.

When Manually Sweeping Speed is Lower Than Reading Speed

Assume that the hand-held copier is manually moved at a speed slightly lower than the predetermined speed, and that encoder section 139 outputs only one pulse between two consecutive pulses of the CCD exposure-timing signal. In this case, the count value of counter 76 provided in timing signal-generating section 152 remains "0", as has been described above. Hence, "+1 line" command signal generator 185 produces no "+1 line" command signal. The address data output by address counter 161 remains unchanged and still represents "ith line, 0th digit." This address data is supplied to adder circuit 163, and is therefore stored in the register provided in adder circuit 163. Accordingly, no process of "+1 line" command signal is carried out. Thus, an address of image data memory 160 is designated by only the output of address counter 161. The digit address is thus incremented by one every time a "+1" signal is supplied from section 152 to address counter 161. When (n+1)th "+1" signal is input to address counter 161, the address data is changed to "ith line, nth digit". As a result, in image data memory 160, image data is written at 0th to nth digits of ith line, as is shown in FIG. 7. (The ith line has been designated by the output of address counter 161, too.)

Upon completion of the writing of the one-line image data into image data memory 160, read-timing signal generator 181 of timing signal-generating section 152 stops generation of the read-timing signal "a". Then, the other components of section 152 remain in a waiting condition until encoder section 139 supplies the next pulse signal representing the distance the hand-held copier is swept across original B. As has been described, digit counter 184 outputs a carry signal when the one-line image data is written into image data memory 160. This carry signal is delayed by delay circuit 186, and is input as a set signal to address counter 161. Then, the data stored in the register provided in adder circuit 163 is transferred to address counter 161. In this case, the count value of address counter 161 remains unchanged. The sequence of the operations described in the preceding paragraph is repeated to write other lines of image data, one after another, into image data memory 160, as long as encoder section 139 produces only one pulse between any two consecutive pulses of the CCD exposure-timing signal.

When Manually Sweeping Speed is Higher than Reading Speed

When the user sweeps the hand-held copier at a speed higher than the predetermined speed, encoder section 139 outputs two pulses between any two consecutive pulses of the CCD exposure-timing signal. Assume that encoder section 139 produces two pulses between any two consecutive pulses of the CCD exposure-timing signal, as is illustrated in FIGS. 6A and 6B. In this case, counter 176 provided in timing signal-generating section 152 has its count value increased by one. When CCD exposure-timing signal generator 171 outputs the next CCD exposure-timing signal under this condition, the output of flip-flop 174 is supplied as enable signal "ES" to read-timing signal generator 181. In response to this enable signal "ES", signal generator 181 outputs read-timing signal "a". Signal "a" is supplied to A/D converting section 157 and also to serial-to-parallel converting signal generator 183. In response to signal "a", signal generator 182 produces serial-to-parallel converting signal "b". This signal "b" is input to serial-to-parallel converting section 158 and also to address counter timing signal generator 183. In synchronism with signal "b", signal generator 183 generates a "+1" signal. The "+1" signal is supplied to address counter 161 and address selector 162. The count value of address counter 161 thereby increases by one. Hence, address counter 161 supplies the address data representing "ith line, 0th digit" to adder circuit 163 and address selector 162. Address selector 162 has selected address counter 161 in accordance with the "+1" signal supplied from signal generator 183. As a result, the address "ith line, 0th digit" of image data memory 160 is designated and the image data supplied from serial-to-parallel converting section 158 is written at this address, as illustrated in FIG. 7. Then, in the timing signal generator 152, "+1" line command timing signal from timing signal generator 185 is output to adder circuit 163 in response to the count value of counter 176 when the "+1" signal's level is returned to a low level after the "+1" signal is output from address counter timing signal generator 183. The count value of counter 176 is "1" at this time. Therefore, signal generator 185 outputs only one "+1 line" command signal, which is input to adder circuit 163. The address data stored in the register provided in adder circuit 163 is incremented by one, thus changing from "ith line, 0th digit" to "(i+1)th line, 0 digit". The new address data, "(i+1)th line, 0th digit", is input to address selector 162. Address selector 162 is connected to adder circuit 163 when the "+1" signal supplied from timing signal-generating section 152 falls to the low level. Hence, the output of adder circuit 163 is supplied to image data memory 160. As a result, the same image data as has been written at the address "ith line, 0th digit" is written at the address "(i+1)th line, 0th digit".

When the next "+1" signal is output by timing signal-generating section 152, the count value of address counter 161 is incremented by one, whereby address data representing "ith line, 1st digit" is provided. Meanwhile, in response to the "+1" signal, address selector 162 is connected to address counter 161. Therefore, the "ith line, 1st digit" address of image data memory 160 is designated. The next image data supplied from serial-to-parallel converting section 158 is thereby written at the "ith line, 1st digit" address of image data memory 160. When timing signal-generating section 152 outputs a "+1 line" command signal thereafter, the count value of address counter 161 is incremented by one line, whereby the address data is changed from "ith line, 1st digit" to "(1+1)th line, 1st digit." This new address, "(i+1)th line, 1st digit", is supplied via address selector 162 to image data memory 160, in the specific manner described above. As a result, the same image data as has been written at the "ith line, 1st digit" address is written at the "(i+1)th line, 1st digit" address of image data memory 160. This is one of the features according to the invention.

The sequence of operations, which has been explained in the preceding paragraph, is repeated until the same image data is written in the ith line and (1+1)th line memory locations of image data memory 160. When the image data is written in these line memory locations, address data "(i+1)th line, nth digit" is stored in the register provided within adder circuit 163. This address data is set in address counter 161 when timing signal-generating section 152 outputs a set signal. Hence it is made possible to write the next line of image data.

Faster Manual Sweeping

When the hand-held copier is moved across original B at such high speed that encoder section 139 outputs three pulses between two CCD exposure-timing signals, as is illustrated in FIGS. 6A and 6B, the count value of counter 176 provided in timing signal-generating section 152 increases to "2". Therefore, the "+1 line" command signal generator 185 of section 152 produces two sets of "+1 line" command signals at prescribed intervals when the "+1" signal output from address counter timing generator 183 falls to the low level. In this case, adder circuit 163 designates address "(1+1)th line, 0th digit" in response to the first "+1 line" signal output by section 152 after address counter 161 has designated address "ith line, 0th digit" in the manner described above. Then, in response to the second "+1 line" command signal, adder circuit 163 changes address data "(i+1)th line, 0th digit" is changed to "(i+2)th line, 0th digit". This new address data "(i+2)th line, 0th digit" is supplied via address selector 162 to image data memory 160. Thereafter, timing signal-generating section 152 outputs a "+1" signal, and the count value of address counter 161 is incremented to "ith line, 1st digit". At this time, address selector 162 is coupled to address counter 161. The ith line memory location of image data memory 160 is thereby designated. Thereafter, the (i+1)th and (i+2)th line memory locations are designated in the same way. Hence, the same image data is written in the three line memory locations of image data memory 160, which is also one of the featured functions.

As may be understood from the above functions, the faster the hand-held copier is moved than the predetermined speed, the more line memory locations of image data memory 160 are used to store the same image data.

Printing Operation

It will now be explained how the hand-held copier 100 prints the image data, which has been acquired from original B, on a piece of paper A.

First, power/read/print switch 104 is moved to the "print" position, thereby setting the hand-held copier into the printing mode. Control section 151 produces select signals "d" and "e", whereby data selector 158 and address selector 162 are coupled to control section 151. The user sweeps the copier across paper A in the direction of arrow X (FIG. 1), while keeping printing section 103 in contact with paper A and depressing both operation switches 105a and 105b. As the hand-held copier is moved this way, rubber rollers 125a and 125b rotate, thereby rotating gears 126, 127 and 128. Encoder disk 134, which is fastened to gear 128, therefore rotates. The light emitted from LED 136 is thus intermittently applied to photosensor 137 through radial slits 138 cut in encoder disk 134. As a result, photosensor 137 outputs pulses, which form a signal representing the speed at which the hand-held copier is being moved across paper A.

The rotation of gear 128 is transmitted by one-way clutch 133 to ribbon-feeding roller 123, and further to ribbon take-up roller 124 by gears 129 and 130. As rollers 123 and 124 rotate, ink ribbon 122a is fed from roll 122, is guided through slit 143, passes by the heating section 121a of thermal print head 121, is guided through ribbon-guiding window 142, is further guided by ribbon-feeding roller 123, and is finally taken up around ribbon take-up roller 124. Ribbon-feeding roller 123 rotates, thereby feeding ribbon 122a at the same speed as the hand-held copier is swept across paper A. Hence, no relative movement occurs between ribbon 122a and paper A.

The output pulses of photosensor 137 are supplied to control section 151 and also to timing signal-generating section 152. These pulses are the output signal of encoder section 139, which represents the distance the hand-held copier has moved across paper A. In accordance with this signal supplied from encoder section 139, section 152 generates and supplies print-timing signals to thermal printer head drive circuit 164. Further, in accordance with the output signal of encoder section 139, section 152 also designates the line addresses and digit addresses of image data memory 160, one after another. The image data is thereby read out from memory 160 via data selector 159. Meanwhile, control section 151 calculates the time for supplying power to thermal printer head 121, from the temperature of printer head 121 detected by temperature sensor 155, the voltage represented by the output signal of the power-supply voltage detector, and the density selected by rotating density control dial 107. Control section 151 also inputs the image data to printer head drive circuit 164. Circuit 164 drives thermal printer head 121 in accordance with the control data supplied from control section 151 and the timing signals supplied from timing signal-generating section 152. Thermal printer head 121 therefore prints the image data on paper "A" by using ink ribbon 122a. As the hand-held copier is moved across paper A during this printing operation, the unused portion of ribbon 122a is fed from roll 122, and the used portion of ribbon 122a is taken up around ribbon take-up roller 124. In this way, the image data stored in memory 160 is printed on paper A as the user sweeps the hand-held copier across paper A.

Key-In Data Printer

A key-in data printer according to a second embodiment of the present invention will now be described with reference to FIGS. 8 to 11. This key-in data printer is similar to the hand-held copier according to the first embodiment of the present invention.

It should be noted that the same reference numerals employed in the first embodiment indicate the similar or same circuit elements according to the second embodiment.

Briefly speaking, this apparatus is different from the hand-held copier in that a key input section is used, instead of an image sensor, in order to input data. In other words, this copier functions as a printer equipped with a word processor.

Figure 8:
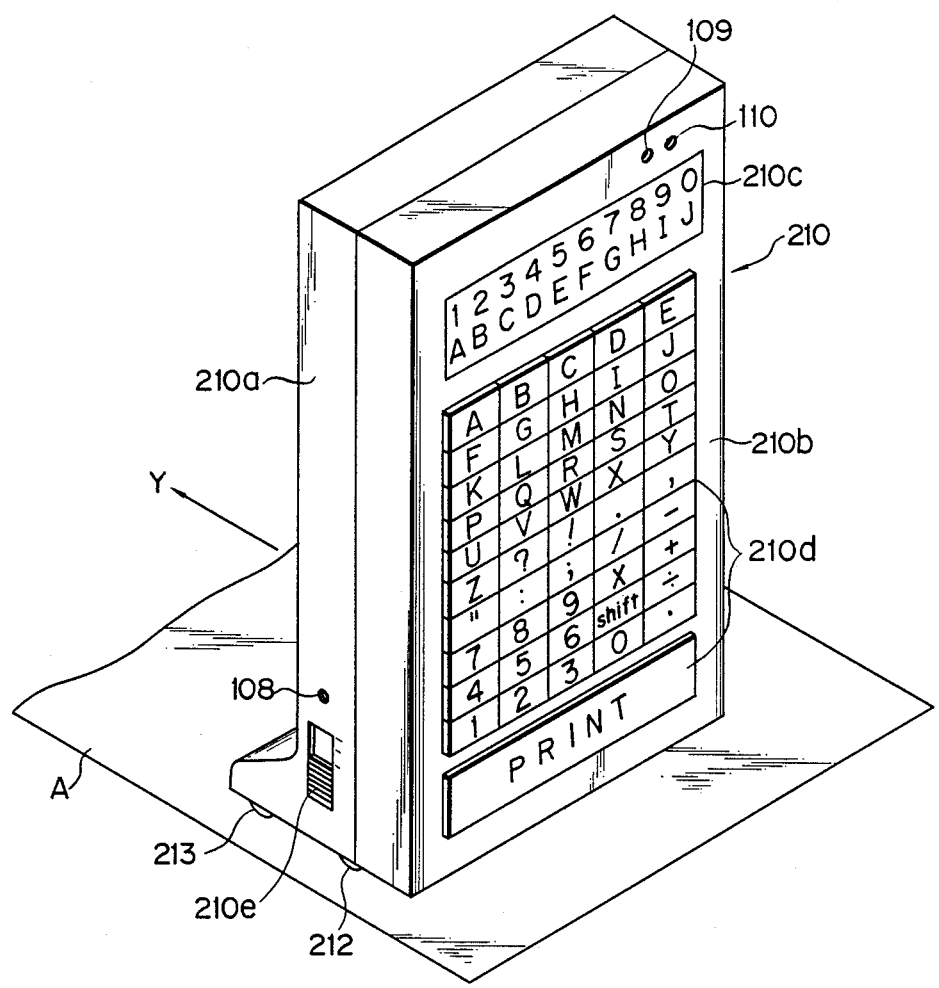
FIG. 8 is a perspective view showing the outer appearance common to three key-in data printers according to second, third and fourth embodiments of the invention.

FIG. 8 is a perspective view of this key-in data printer. As is shown in this figure, the key-in data printer comprises housing 210. Housing 210 consists of front case 210b and rear case 210a. Housing 210 is shaped like a rectangular box. As is shown in FIGS. 9 and 10A to 10C, an elongated printing opening 211 are cut also in the lower side of housing 210. Main roller 212 and auxiliary roller 213 are provided within housing 210, extending parallel to each other. These rollers 212 and 213 slightly protrude from housing 210 through the openings, and thus contact a piece of paper A. Main roller 212 is located close to the front side of housing 210, and auxiliary roller 213 is located close to the rear side thereof. Therefore, rollers 212 and 213 support housing 210 such that housing 210 does not tip over.

As is shown in FIG. 8, display section 210c, and key input section 210d are provided on the front side of housing 210, i.e., the outer surface of front case 210b. Display section 210c has a dot-matrix liquid crystal display which can display two lines of characters in 16×16 dot pattern, each line consisting of ten characters. Key input section 210d has number entry keys, character keys, and a print key. The number entry keys and the character keys are selectively depressed to input data. The print key is depressed to print data on paper A.

Power/input/print switch 210e is provided on one vertical side of rear case 210a. Switch 210e can be moved to a power-off position, a data-input mode position, and a print-mode position. When it is moved to the data-input mode position, the key-in data printer will be set in a data-input mode. When it is moved to the print-mode position, the key-in data printer will be set in a print mode.

Figure 9:
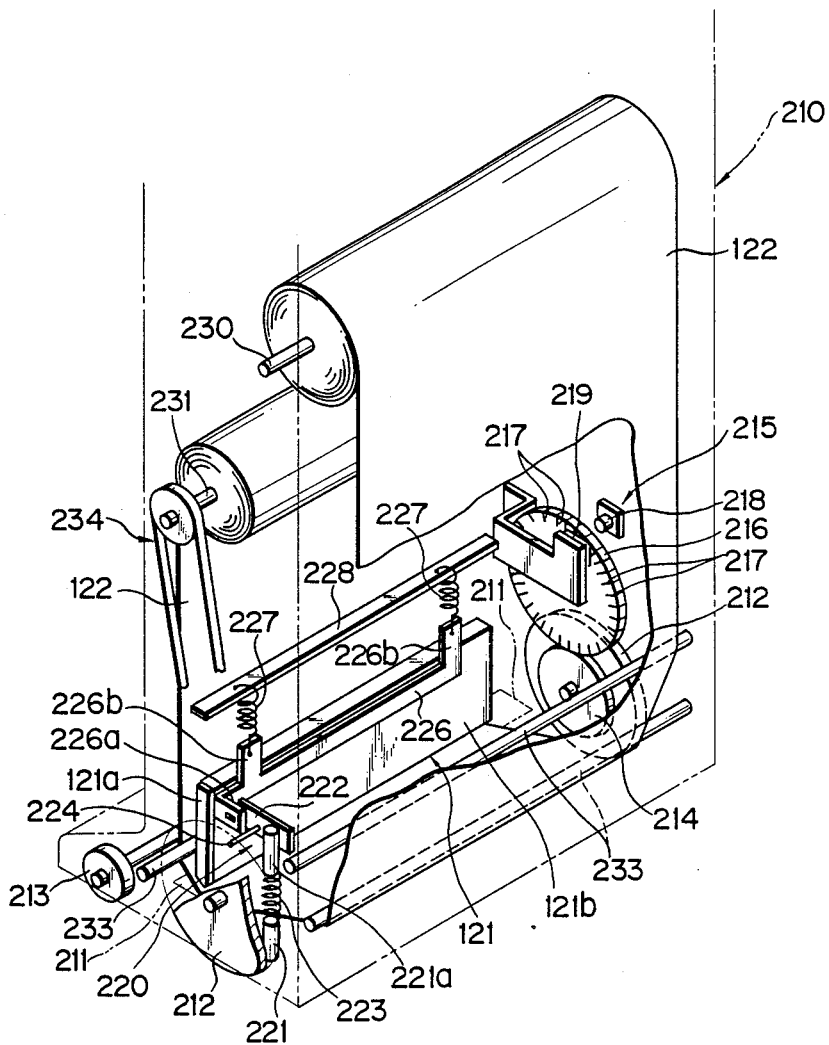
FIG. 9 is a perspective view showing the internal structure of the key-in data printer according to the second embodiment of the invention.

As is shown in FIG. 9, which shows the internal structure of the key-in data printer, encoder 215 is provided within housing 210. Encoder 215 is designed to output a pulse every time main roller 212 rotates through a predetermined angle. More specifically, encoder 213 comprises toothed disk 216, light-emitting element 218 provided at one side of toothed disk 216, and light-receiving element 219. Toothed disk 216 is in mesh with drive gear 214 fastened to main roller 212, and can thus rotate when main roller 212 rotates. Disk 216 has a number of slits 217 cut in its circumference and equidistantly spaced form one another in the circumferential direction of disk 216.

Printer Head Transport Mechanism

As is shown in FIG. 9 and FIG. 10A to 10C, printer head transport mechanism 220 for moving a print head (later described) is provided within the lower portion of housing 210. This mechanism 220 comprises contact pin 221 and pivot arm 222. Contact pin 221 is vertically positioned close to the front side of housing 210 and can move up and down. In its lowest position, pin 221 contacts paper A. Contact pin 221 is guided by a pin guide (not shown) while it is moving up and down. Pin 221 is coupled by coil spring 223 and connecting rod 221a to one end of arm 222. Arm 222 is pivotably supported at its middle portion by horizontal shaft 224 provided within housing 210. Therefore, arm 222 can rotate in either direction when contact pin 221 moves up and down. Coil spring 223 is in its maximum expanded condition when no force is applied on contact pin 221.

Thermal printer head 121 is provided within housing 210. Printer head 121 can move up and down. When printer head 121 moves down, it can thrust out of housing 210 through printing window 211. Thermal printer head 121 includes ceramic substrate 121a, a number of dot-shaped electrodes (not shown in detail) arranged in a line form on the lower end of substrate 121a, and reinforcing metal plate 121b fastened to, and covering, one side of substrate 121a. Printer head 121 is guided by a head guide (not shown) provided within housing 210, when it is movable in the vertical direction in the drawing. Head-supporting plate 226 is fastened to reinforcing metal plate 121b by screws, or is adhered to plate 121b. Hence, plate 226 also moves up and down when thermal printer head 121 moves in the same way. Head-supporting plate 226 has arm-coupling portion 226a at one end. Pivot arm 222 is pivotally coupled to this portion 226a of plate 226. A pair of coil springs 227 are connected at one end to spring support 228 provided within housing 210 and horizontally extending. More precisely, springs 227 are suspended from support 228. The lower ends of these springs 227 are connected to spring-connecting portions 226b of head-supporting plate 226. Springs 227 are contraction springs. Therefore, they always bias printer head 121 upwardly in the drawing.

Printer Head in Rest Position

Figure 10A:
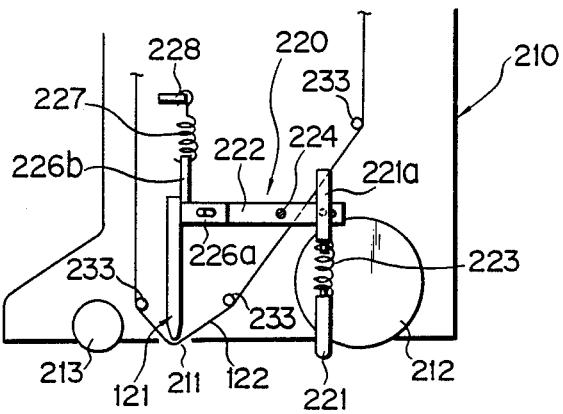
FIG. 10A is a sectional view schematically representing the key-in data printer according to the second embodiment being not used.
Figure 10B:
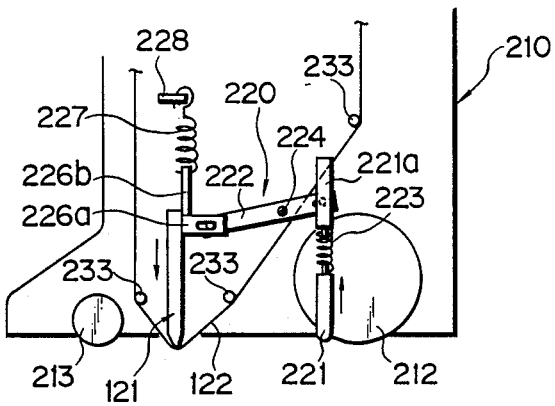
FIG. 10B is also a sectional view schematically showing the key-in data printer according to the second embodiment with its printer head projecting out of the housing of the copier.

When the key-in data printer is not in the print mode, printer head transport mechanism 220 holds thermal printer head 121 within housing 210 by means of coil springs 227, as is illustrated in FIG. 10A. As long as printer head 121 is held inside housing 210, pivot arm 222 is rotated clockwise by coil springs 227, thereby pushing down connecting rod 221a. Contact pin 221, which is coupled to rod 221a by coil spring 223 (a compression spring), is thereby lowered, and its lower end portion protrudes out of housing 210. The distance over which thermal printer head 121 can move in the vertical direction, and the distance over which contact pin 221 can thrust out of housing 210 are determined by a stopper (not shown), which limits the clockwise rotation of rotatable arm 222. Printer head transport mechanism 220 is designed so as to push the tip of printer head 121 out of housing 210 when contact pin 221 is pushed upwardly. More specifically, when contact pin 221 is pushed upward as is shown in FIG. 10B, coil spring 223 is compressed until its reaction force surpasses the total pull of coil springs 227. As pin 221 is further pushed up, connecting rod 221a is pushed up by coil spring 223. Pivot arm 222 is thereby rotated counterclockwise, while elongating coil springs 227. As a result, thermal printer head 121 is pushed down, and its lower end protrudes from the lower side of housing 210. When contact pin 221 has its lower end moved up to the same level as the lower side of housing 210, which contacts paper A, the lower end of printer head 121 is lowered about one to a few millimeters below the lowest portions of rollers 212 and 213.

Figure 10C:
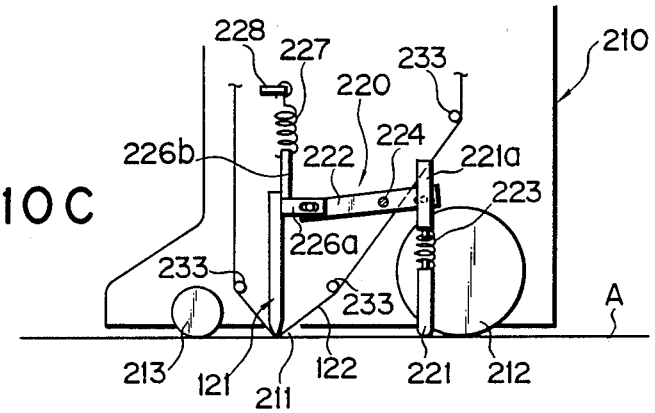
FIG. 10C is a sectional view schematically illustrating the key-in data printer according to the second embodiment in the printing mode.

Contact pin 221 is automatically pushed upward when the user puts the hand-held copier on paper A, with both main roller 212 and auxiliary roller 213 contacting paper A, as is illustrated in FIG. 10C. In this case, thermal printer head 121 is lowered until it contacts paper A, and is not moved down any more. Since coil spring 223 is compressed, it produces a reaction, which urges pivot arm 222 to push down head 121. Hence, printer head 121 resiliently contacts paper A. Coil spring 223 expands or contracts, thereby absorbing the changes in the pressure applied to paper A by head 121, which occur as the user pushes the apparatus onto paper A strongly or weakly. Therefore, coil spring 223 achieves a resilient contact of head 121 with paper A, which is performed under a constant pressure.

Ribbon-feeding shaft 230 and ribbon take-up shaft 231 are provided within housing 210, as is shown in FIG. 9. These shafts 230 and 231 extend horizontally and parallel to each other. Both shafts 230 and 231 can be removed from housing 210. Ribbon 122 is wound around ribbon-feeding shaft 230. The forward end portion of ribbon 122 is guided downwardly, then horizontally across the lower end of head 121, and finally upwardly, and it is taken up around ribbon take-up shaft 231. Ribbon-guiding rods 233 are also provided within housing 210. These rods 233 extend horizontally and parallel to one another, for guiding ribbon 122 fed from ribbon-feeding shaft 230. Ribbon take-up shaft 231 is rotated to take up ribbon 122, as the user manually sweeps the copier across paper A to print data on paper A. Shaft 231 is driven by belt-drive mechanism 234 which operates interlockingly with main roller 212.

Circuit Arrangement of Key-In Data Printer

The electronic circuit provided within housing 210 of the key-in data printer reference is shown in FIG. 11. As is shown in this drawing, the circuit arrangement includes key input section 210d and changeover switch 210e. Section 210d and changeover switch 210e are connected to control section 250. When the key-in data printer is set in the input mode, the data such as alphanumerical data, which has been produced by operating key input section 210d, is input to control section 250, and a printer-start signal can be input from section 210d to control section 250. Changeover switch 210e is operated to input a power-off signal, a input-mode signal, or a print-mode signal to control section 250.

Control section 250 is connected to encoder section 139, and can therefore receive the output signal of encoder section 139. LED section 150, printer head drive circuit 164, temperature sensor 155, data memory 251, character generator 252 and display section 210c are connected to control section 250.

Data memory 251 is addressed by control section 250. The data input from key input section 210d is written through control section 250 into data memory 251 when the copier is set in the input mode. The data is read out from data memory 251 and supplied to control section 250 when the copier is set in the print mode. In control section 250, the data input form key input section 210d is converted into ASCII (American Standard Code for Information Interchange) codes. The ASCII codes are input to data memory 251.

Character generator 252 converts the data input from section 210d or the ASCII codes read from data memory 251 into data representing 16×16 dot character patterns to be displayed by display section 210c, or into 24×24 dot character patterns to be printed by thermal print head 121.

Display section 210c is designed to display the data input from key input section 210d when the copier is set in the input mode, and display the data read out from data memory 251 when the copier is set in the print mode.

Operation of Key-In Data Printer

The operation of the manually sweeping key-in data printer, which has been described, will now be explained, referring to FIGS. 8 to 11.

Assume that the user slides changeover switch 210e from a power-off position to an input-mode position (FIG. 8). Then, the key-in data printer is turned on, and set in the input mode. Thereafter, as the user depresses the keys of key input section 210d, the addresses of data memory 251 are sequentially designated, and the data input by this key operation is stored into data memory 251. In the meantime, character generator 252 produces data representing the character patterns (i.e., the input data). This data is supplied to display section 210c and is thus displayed in the form of characters.

When the user slides changeover switch 210e from the input-mode position to a print-mode position, the hand-held copier is brought into the print mode. Thereafter, the user holds the copier and sweep it across paper A to be printed in the direction of the arrow Y, as is shown in FIG. 8, thereby to print the data on paper A. When the lower side of housing 210 contacts paper A, contact pin 221 is pushed upward via compressing coil spring 223 as shown in FIG. 10C. Coil spring 223 pushes connecting rod 221a, whereby pivot arm 222 rotates counterclockwise, thus pushing printer head 121 down against the pull of coil springs 227. As a result, printer head 121 presses ribbon 122 onto paper A. As the user sweeps the key-in data printer across paper A in the direction Y shown in FIG. 8, encoder section 139 generates timing signals. The timing signals are supplied to control section 250 and printer head drive circuit 164. In response to these timing signals, control section 250 reads the data, line by line, from data memory 251. The data thus read out from memory 251 is supplied to printer head drive circuit 164. This circuit 164 drives thermal printer head 121 in accordance with the input data in synchronism with the timing signals supplied from encoder section 139, provided that the user keeps on depressing a print key included in key input section 210d. Hence, printer head 121 prints the data on paper A. Ink ribbon 122 is fed from ribbon-feeding shaft 230 and taken up around ribbon take-up shaft 231 as the key-in data printer is moved across paper A in the direction Y. Unless print key 210d is being depressed, thermal printer head 121 is not operated even if the user sweeps the key-in data printer across paper A in the direction Y indicated in FIG. 8. In other words, printer head 121 is not brought into the print mode under the condition that the key-in data printer is manually swept on paper A, but the print key 210d maintains undepressed.

Advantages of Printer Head Transport Mechanism

As has been described, head transport mechanism 220 provided within housing 250 holds thermal printer head 121 inside housing 210 when the copier is not used to print data. Mechanism 220 includes coil spring 223 which constitutes components of the head transport mechanism 220. This coil spring 223 resiliently depresses printer head 121 onto paper A with applying a given pressure thereto when the key-in data printer is used to print data on paper A. When the key-in data printer is in the no print condition, printer head transport mechanism 220 is completely stored within housing 210 by means of coil spring 223. Therefore, thermal printer head 121 is protected from damage or dust when the copier is not used to print data. Since the changes in the pressure applied by printer head 121 to paper A are absorbed by coil spring 223, printer head 121 mechanically contacts paper A, applying a constant pressure thereto. Therefore, printer head 121 can print data in a uniform density on paper A even if the force the user applies to the key-in data printer during the data-printing changes. The key-in data printer can, therefore, accomplish a high-quality printing. Furthermore, since printer head transport mechanism 220 prevents head 121 from applying too high a pressure to paper A, the wear of the printing face of head 121 can be minimized, thus lengthening the lifetime of printer head 121.

First Modified Head Transport Mechanism

Figure 12A:
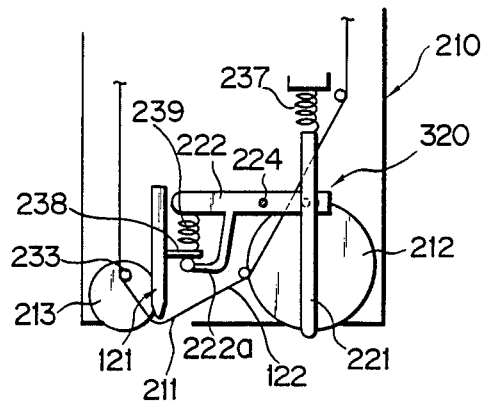
FIG. 12A is a sectional view schematically showing the key-in data printer according to the third embodiment being not used.
Figure 12B:
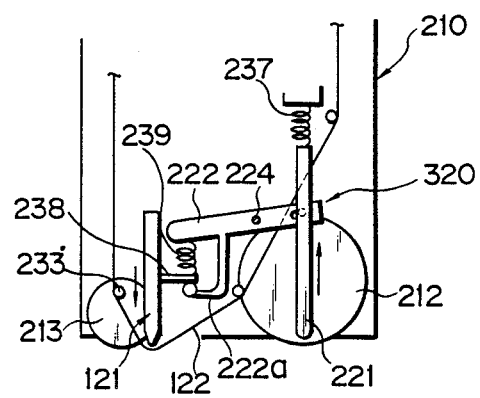
FIG. 12B is a sectional view schematically representing the key-in data printer according to the third embodiment with its printer head projecting out of the housing of the apparatus.
Figure 12C:
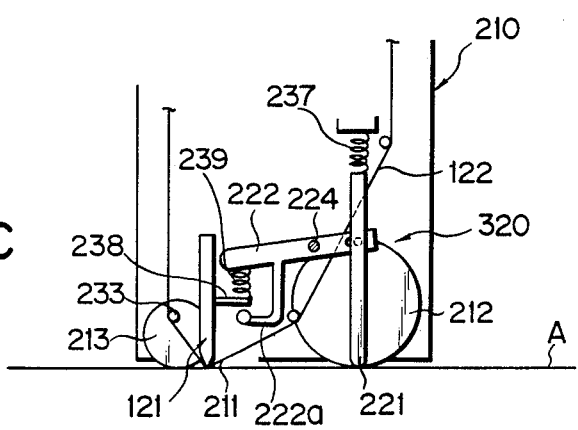
FIG. 12C is also a sectional view schematically showing the key-in data printer according to the third embodiment in the printing mode.

In the second embodiment shown in FIGS. 8 to 11, coil spring 223, which achieves a resilient contact between head 121 and paper A, was connected at the lower end to print surface contact pin 221 and at the upper end to connecting rod 221a. Alternatively, this spring 223 may be connected at the lower end to printer head 121 and at the upper end to pivot arm 222, as is illustrated in FIGS. 12A to 12C. These figures show a first modified head transport mechanism of the present invention, that is, another type of key-in data printer. In FIGS. 12A, 12B and 12C, the same numerals are used, designating the same components as those used in the previous embodiments. Accordingly, no description is made in these components.

As is shown in FIGS. 12A to 12C, head transport mechanism 320 comprises contact pin 221, pivot arm 222 pivotably coupled to pin 221, and coil spring 237 urging pin 221 downward. Lever 222a is integrally formed with pivot arm 222 and extending downwardly therefrom. Lever 222a abuts against horizontal plate 238 welded to reinforcing metal plate 225a (FIG. 9) fastened to one side of thermal printer head 121. Arm 222 is pivotably supported at the middle portion by horizontal shaft 224. It is pivotably coupled at one end to contact pin 221. Compression coil spring 239 is interposed between the other end of arm 222 and horizontal plate 238.

When the key-in data printer is not used, coil spring 237 pushes contact pin 221 downward such that the lower end of pin 221 protrudes from the lower side of housing 210 as is illustrated in FIG. 12A. Coil spring 237 also pivots arm 222 clockwise, whereby lever 222a holds head 121 within housing 210. Printer head transport mechanism 320 is designed so as to push the tip of printer head 121 out of housing 210 when contact pin 221 is pushed up as is shown in FIG. 12B, pivot arm 222 pivots in a counterclockwise direction, thus lowering lever 222a. Printer head 121 is therefore pushed down by coil spring 239, and its tip protrudes from the lower side of housing 210. As in the second embodiment, the tip of printer head 121 is lowered about one to a few millimeters below the lowest portions of rollers 212 and 213 when contact pin 221 has its lower end moved up to the same level as the lower side of housing 210.

Contact pin 221 is automatically pushed up when the user puts the key-in data printer on paper A, with both main roller 212 and auxiliary roller 213 contacting paper A, as is illustrated in FIG. 12C. Once thermal printer head 121 has contacted paper A, it is not lowered any more. Since coil spring 239 is compressed, it produces a reaction, which urges thermal printer head 121 into a resilient contact with paper A. In this condition, horizontal plate 238 is separated from lever 222a. Thus, printer head 121 is pushed onto paper A by only coil spring 239, without being interfered by lever 222a.

Also in this embodiment, printer head transport mechanism 320 holds thermal printer head 121 inside housing 210 when the key-in data printer is not used to print data. When the copier is put on paper A to print data thereon, the tip of printer head 121 is automatically moved out of the lower side of housing 210. Thereafter, coil spring 239 maintains printer head 121 in a resilient contact with paper A. The third embodiment can, therefore, have the same advantages as the second embodiment shown in FIGS. 8 to 11. In the above embodiment, printer head 121 was vertically moved by employing coil spring 239. Alternatively, a knob is provided on an outer surface of printer housing 210 so as to transport printer head 121 in the vertical direction. No ink ribbon 122 is needed when printing data on thermal print paper.

Second Modified Head Transport Mechanism

Another key-in data printer according to a fourth embodiment of the invention, will now be described with reference to FIGS. 13, 14A, 14B and 15. In these figures, the same components as those of the second and third embodiments are designated by the same numerals. Therefore the same components will not be explained in detail.

Figure 13:
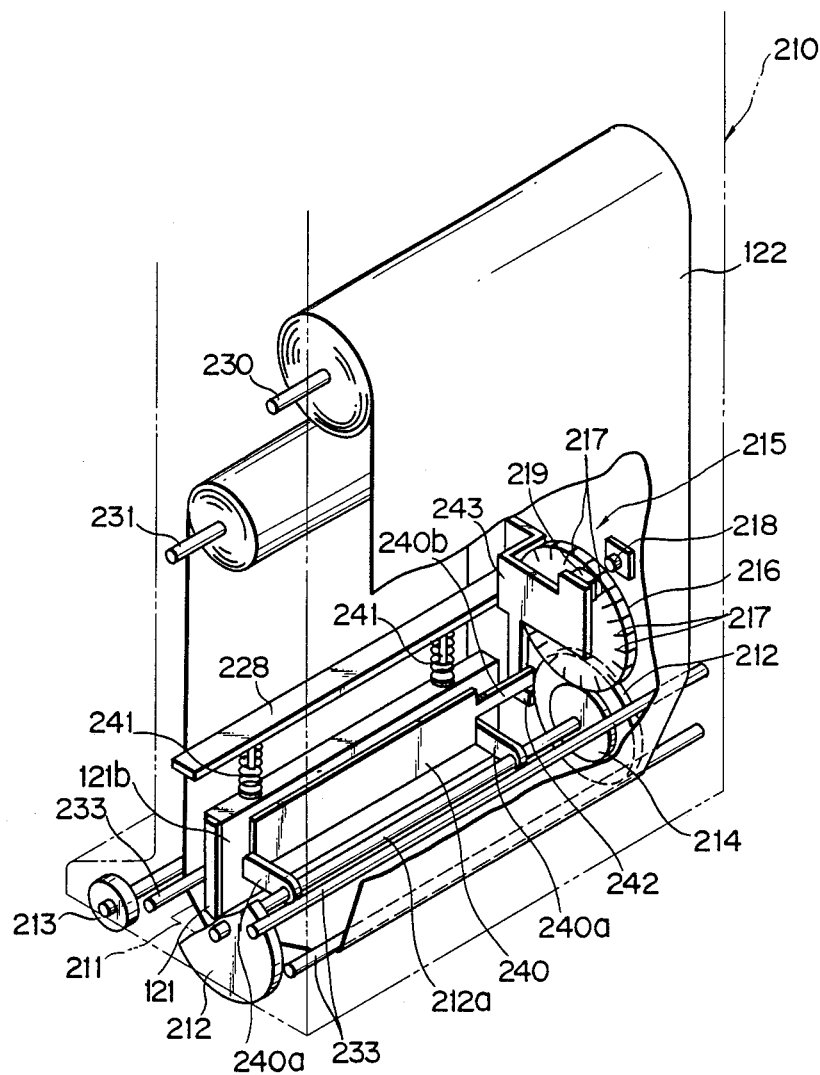
FIG. 13 is a perspective view illustrating the internal structure of the key-in data printer according to the fourth embodiment.

As is shown in FIG. 13, pivotable frame 240 is pivotably provided under housing 210 in the vertical direction. Frame 240 is a rectangular plate having two arms 240a and 240b extending from both ends thereof. It extends parallel to roller shaft 212a which is provided also within housing 210 and supports two main rollers at its ends. Both arms 240a and 240b of frame 240 are rotatably supported by shaft 212a. Frame 240 can, therefore, rotate about roller shaft 212a. Frame 240 is adhered to reinforcing metal plate 121b which is secured to one side of thermal printer head 121. Alternatively, pivotable frame 240 can be fastened to metal plate 121b by means of screws. Printer head 121 can thus be moved up and down as pivotable frame 240 pivots around shaft 212a.

Figure 14A:
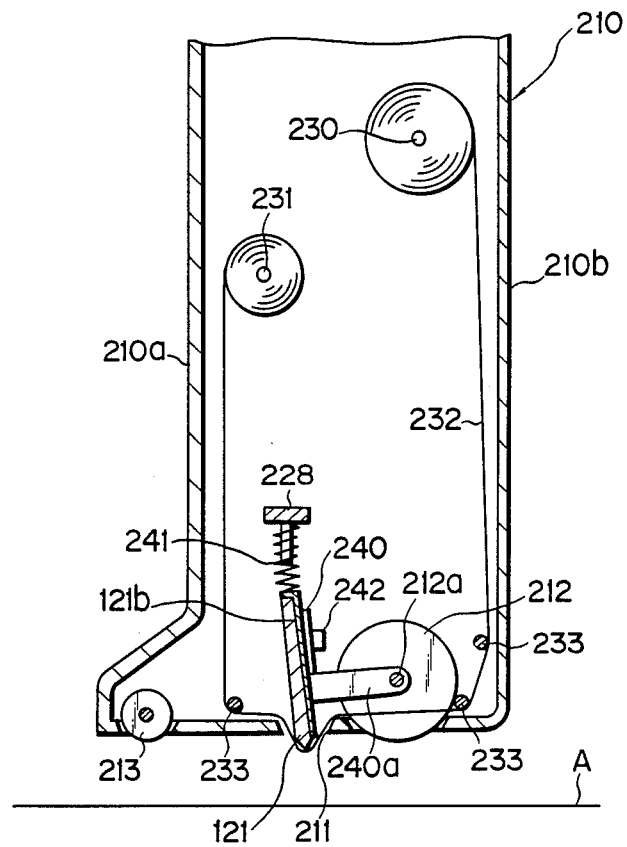
FIG. 14A is a sectional side view showing a printer head before mechanically contacting a piece of paper.

Spring support 228 is provided within housing 210, extending in the horizontal direction above thermal printer head 121. Two compression coil springs 241 are interposed between head 121 and spring support 228. These coil springs 241 push head 121 such that the lower end of printer head 121 protrudes out of the lower side of housing 210 as is illustrated in FIG. 14A, as long as the hand-held apparatus is not used to print data on paper A. The lower end of head 121 protrudes from housing 210 through printing window 211 cut in the lower side of housing 210. Projection 240b is integrally formed with pivotable frame 240. Stopper 242 is secured to plate 243 supporting light-receiving element 219 of encoder section 215. Stopper 242 abuts on projection 240b, thus preventing printer head 121 from further protruding out of housing 210, despite the force which coil springs 241 exert on head 121. Hence, the position of stopper 242 determines the distance the thermal printer head can protrude from housing 210.

Figure 14B:
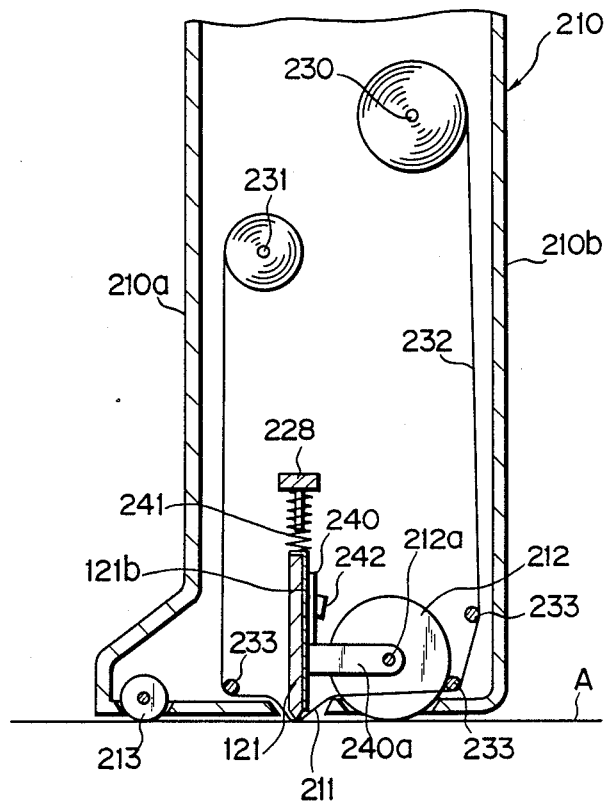
FIG. 14B is also a sectional side view showing the printer head in contact with the piece of paper.

When the user puts the key-in data printer on paper A, with main rollers 212 and auxiliary rollers 213 contacting paper A as is shown in FIG. 14B, head 21 is also pushed up, thus compressing coil springs 241. Springs 241 therefore produce a reaction, which keeps head 121 in a resilient contact with paper A.

Overall Operation

Like the key-in data printer of the second and third embodiments, this copier has key input section 210d and data memory 251. Key input section 210d is operated, thus providing data, when the key-in data printer is set in the input mode. The data is written into data memory 251. The key-in data printer is set in the print mode to print the data stored in data memory 251. Then, the user depresses the key-in data printer on paper A. As a result, rollers 212 and 213 contact paper A as is shown in FIG. 14B. Thermal printer head 121 is therefore pushed up and compresses coil springs 241. Coil springs 241 produces a reaction, which keeps head 121 in a resilient contact with paper A. The user manually sweeps the key-in data printer across paper A in the arrow direction indicated in FIG. 8, whereby the data is printed on paper A.

Figure 15:
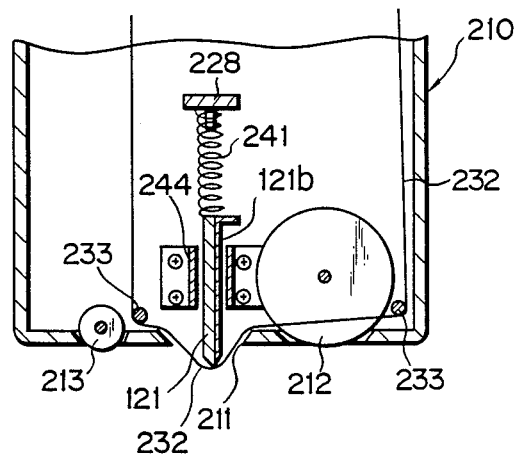
FIG. 15 is a sectional side view of a printer equipped with a modified mechanism for moving a printer head.

As is shown in FIG. 15, thermal printer head 121 can be guided by head guide 244 which is held in a position within housing 210, instead of being fastened to rotatable frame 240. In this case, head 121 can move in the vertical direction.

In the fourth embodiment, as has been described, coil springs 241 push down printer head 121 such that the lower end of head 121 protrudes out of housing 210, when the key-in data printer is not used to print data on paper A. When rollers 212 and 213 are brought into contact with paper A so that the key-in data printer may print data on paper A, printer head 121 is automatically pushed up, thereby compressing coil springs 241. Springs 241 produce a reaction, and keep head 121 in a resilient contact with paper A. The pressure applied to paper A by head 121 remains unchanged since the changes of the pressure the user applies to paper A during the printing operation are absorbed by coil springs 241. Therefore, the fourth embodiment can print data, the key-in data printer may print data on paper A, printer head 121 is automatically pushed up, thereby compressing coil springs 241. Springs 241 produce a reaction, and keep head 121 in a resilient contact with paper A. The pressure prolongs the lifetime of thermal printer head 121.

As has been described above, two coil springs 227 are used in the second embodiment, two coil springs 239 in the third embodiment, and two coil springs 241 in the fourth embodiment. In each of these embodiments, these two coil springs allow printer head 121 to move up and down. Hence, when the user sweeps the copier across a waving digit sheet to print data on this sheet, the coil springs keep printer head 121 in contact with the sheet though the sheet is waving. Thus, the key-in data printer can print data on the sheet in a uniform density. Furthermore, since the coil springs expand or contract independently of each other, they keep the entire printing face of head 121 in a resilient contact with paper A even if the key-in data printer is erroneously positioned with the lower side of housing 210 inclined to paper A. Therefore, the data can be printed in a uniform density in spite of the erroneous positioning of the key-in data printer.

Modifications

In the first, second and third embodiments described above, the contact pin 221 of head transport mechanism 220 is automatically pushed up when the key-in data printer is put on paper A, and printer head 121 is automatically thrusted out of housing 210. Instead, a slider can be provided on one side of housing 210 and be connected to printer head 121, such that head 121 is moved up and down when the user operates this slider.

Also, in the previous preferred embodiments, the rollers, e.g., rubber roller 125a were employed as a rolling member. It is appreciated that other mechanical parts such as a wheel may be employed as such a rolling member.

What is claimed is:

1. A hand-held electronic apparatus, including:
   a manually manipulatable housing, said housing comprising:
   input means for producing image information signals while said housing is manually swept across a material having image information to be copied;
   memory means for storing the image information signals derived from said input means;
   printing means for printing image information on a printing medium while said housing is manually swept across said printing medium;
   printer-driving means for driving said printing means in response to the image information signals when read out from said memory means;
   position-detecting means for detecting the relative position of said housing while being swept across either of said material or said printing medium, and for producing a position signal every time said housing is swept over a predetermined distance, said position signal representing the position of said housing with respect to either of said material or said printing medium;
   control means for controlling said printer-driving means in synchronism with the position signal produced by said position-detecting means, so as to cause said printing means to print the image information on said printing medium in the same manner as said image information is formed on said material to be copied; and
   addressing means for designating an area of said memory means in response to the signal produced by said position-detecting means as an image information signal from said input means is written in designated areas of said memory means, and for designating an area of said memory means ahead of the signal produced by said position-detecting means when said image information signal is read out from said memory means and supplied to said printer-driving means, so that image information is printed on said printing medium in correspondence with the signal produced by said position-detecting means.

2. A hand-held electronic apparatus as claimed in claim 1, wherein said printing means includes:
   a thermal printer head; and,
   an ink ribbon interposed between said thermal printer head and said printing medium, for transferring ink onto said printing medium while said thermal printer head is in operation.

3. A hand-held electronic apparatus as claimed in claim 2, wherein said input means is photoelectric converting means for converting the image information formed on said material into said image information signals under the control of said control means while said housing is manually swept across said material, so that the image information is optically read from said material.

4. A hand-held electronic apparatus as claimed in claim 3, wherein said housing is substantially a rectangular box with at least one opening cut in one end thereof along its longitudinal direction;
   said photoelectric converting means includes:
   a light source provided near said opening for applying light to said material;
   a lens spaced apart from said opening in the longitudinal direction of said housing for collecting the light reflected from said material;
   an image sensor for receiving the light from said lens and converting the received light into electric signals having levels corresponding to the amount of the received light while said housing is manually swept across said material; and,
   said printing means includes said thermal printer head capable of protruding out of said housing through said opening, for contacting via said ink ribbon with said printing medium.

5. A hand-held electronic apparatus as claimed in claim 4, further comprising a rolling member capable of contacting at least one of said printing medium and said material, and for rotating with respect to said housing, while said housing is manually swept across one of said printing medium and said material.

6. A hand-held electronic apparatus as claimed in claim 5, wherein said position-detecting means includes at least one rotary encoder, said rotary encoder further comprising encoder-rotating means for rotating said rotary encoder in response to rotation of said rolling member, and ink ribbon drive means for moving said ink ribbon across said thermal printer head while said rolling member rotates.

7. A hand-held electronic apparatus as claimed in claim 6, wherein said rolling member is at least one pair of wheels and is provided between said photoelectric converting means and said thermal printer head, and said ink ribbon drive means includes a one-way clutch for feeding said ink ribbon while said rolling member rotates in a predetermined direction when said housing is manually swept across said printing medium.

8. A hand-held electronic apparatus as claimed in claim 1, further comprising a command key for generating a print-start signal and a print-end signal and supplying both signals to said control means.

9. A hand-held electronic apparatus as claimed in claim 3, further comprising a command key for generating a read-start signal and a read-end signal by operating said photoelectric converting means and supplying both signals to said control means.

10. A hand-held electronic apparatus as claimed in claim 3, further comprising speed-detecting means for detecting speed data acquired while said housing is manually swept, and
memory control means for writing image information signals indentical to those derived from said photoelectric converting means, into a plurality of different memory regions of said memory means when said speed data exceeds a predetermined speed, the number of said memory regions being determined by a degree of said over speed data.

11. A hand-held electronic apparatus as claimed in claim 1, further comprising means for supporting said printing means in such a manner that said printing means is able to move relative to said housing.

12. A hand-held electronic apparatus as claimed in claim 11, wherein said supporting means includes movable means capable of causing said printing means to protrude out of said housing when said housing is brought into contact with said printing medium.

13. A hand-held electronic apparatus as claimed in claim 12, wherein said movable means includes:
detection means for detecting that said housing has contacted said printing medium; and,
elastic means for causing said printing means to protrude from said housing and come into a resilient contact with said printing medium when said detection means detects that said housing has contacted said printing medium.

14. A hand-held electronic apparatus as claimed in claim 11, wherein said supporting means further includes flexible means for allowing said printing means to move in accordance with a condition under which said housing contacts said printing medium while said housing is manually swept across said printing medium.

15. A hand-held electronic apparatus as claimed in claim 14, wherein said flexible means is constructed by at least one coil spring interposed between said printing means and said housing and urging said printing means toward said printing medium.

16. A hand-held electronic apparatus as claimed in claim 12, wherein said housing includes a rolling member for contacting said printing medium and rotating when said housing is manually swept across said printing medium; and,
said supporting means includes movable means capable of causing said printing means to protrude out of said housing when said rolling member is brought into contact with said printing medium.

17. A hand-held electronic apparatus as claimed in claim 16, wherein said movable means includes:
detection means for detecting that said rolling member has contacted said printing medium; and,
elastic means for causing said printing means to protrude from said housing and come into a resilient contact with said printing medium when said detection means detects that said rolling member has contacted said printing medium.

18. A hand-held electronic apparatus which is sweepable across a printing medium, including:
a manually manipulatable housing;
said housing comprising:
character-date input means for inputting character data;
memory means for storing the character data entered by said character-data input means;
printing means coupled to said memory means for printing the character data stored in said memory means on a printing medium;
position-detecting means for detecting the relative position of said housing while said housing is being swept across said printing medium, and for producing a position-detecting signal every time said housing is swept over a predetermined distance;
signal generating means for generating information signals according to the character data stored in said memory means; and
control means for sequentially supplying said information signals obtained by said signal generating means to said printing means, and for controlling said printing means in response to the position-detecting means, so that said printing means prints the character data on said printing medium.

19. The hand-held electronic apparatus as claimed in claim 18, further comprising supporting means for supporting said printing means such that said printing means is movable relative to said housing.

20. The hand-held electronic apparatus as claimed in claim 19, wherein said supporting means includes movable means for causing said printing means to protrude out of said housing when said housing is brought into contact with said printing medium.

21. The hand-held electronic apparatus as claimed in claim 20, wherein said movable means includes:
detecting means for detecting that said housing has come into contact with said printing medium; and
elastic means for causing said printing means to protrude from said housing and to be in resilient contact with said printing medium when said detection means detect that said housing has contacted said printing medium.

22. The hand-held electronic apparatus as claimed in claim 20, wherein said housing includes a rolling member for contacting said printing medium and for rotating when said housing is manually swept across said printing medium; and
said movable means of said supporting means causes said printing means to protrude out of said housing when said rolling member is brought into contact with said printing medium.

23. The hand-held electronic apparatus as claimed in claim 20, wherein said movable means includes:

detecting means for detecting that said rolling member has come into contact with said printing medium; and elastic means for causing said printing means to protrude from said housing and to be in resilient contact with said printing medium when said detection means detects that said rolling member has come into contact with said printing medium.

24. The hand-held electronic apparatus as claimed in claim 19, wherein said supporting means further includes biasing means for allowing said printing means to move in accordance with a condition wherein said housing has come into contact with said printing medium, and for exerting a force to press said printing means against said printing medium while said housing is manually swept across said printing medium.

25. The hand-held electronic apparatus as claimed in claim 24, wherein said biasing means comprises at least one spring means interposed between said printing means and said housing for urging said printing means toward said printing medium.

26. The hand-held electronic apparatus as claimed in claim 25, wherein said at least one spring means comprises at least one coil spring.

27. The hand-held electronic apparatus as claimed in claim 18, further comprising a rolling member adapted to contact with said printing medium and for rotating with respect to said housing while said housing is manually swept across said printing medium.

28. The hand-held electronically apparatus as claimed in claim 27, wherein said position-detecting means comprises a rotary encoder for rotating on said printing medium while said rolling member rotates.

29. The hand-held electronic apparatus as claimed in claim 18, wherein said printing means includes:
a thermal printer head; and
an ink ribbon interposed between said thermal printer head and said printing medium, for transferring ink onto said printing medium while said thermal printer head is in operation.

* * * * *

UNITED STATES PATENT AND TRADEMARK OFFICE
CERTIFICATE OF CORRECTION

PATENT NO. : 4,947,262

DATED : August 7, 1990

INVENTOR(S) : YAJIMA ET AL

It is certified that error appears in the above-identified patent and that said Letters Patent is hereby corrected as shown below:

In the title page, under "Foreign Application Priority Data", insert the following:

--June 12, 1986  Japan   61-134891--

--June 12, 1986  Japan   61-134895--

--December 10, 1986  Japan  61-190195 (U)--.

Signed and Sealed this

Twenty-eighth Day of April, 1992

Attest:

HARRY F. MANBECK, JR.

*Attesting Officer*       *Commissioner of Patents and Trademarks*